US012781937B2

(12) United States Patent
Kito et al.

(10) Patent No.: US 12,781,937 B2
(45) Date of Patent: Nov. 3, 2026

(54) VEHICLE HEADLAMP

(71) Applicant: KOITO MANUFACTURING CO., LTD., Tokyo (JP)

(72) Inventors: Masanori Kito, Shizuoka (JP); Yuta Tsuyuki, Shizuoka (JP); Takaya Shimizu, Shizuoka (JP); Taishi Hommiya, Shizuoka (JP); Hiroki Kawai, Shizuoka (JP); Tatsuki Atsumi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 19/328,239

(22) Filed: Sep. 15, 2025

(65) Prior Publication Data

US 2026/0009515 A1 Jan. 8, 2026

Related U.S. Application Data

(63) Continuation of application No. PCT/JP2024/008461, filed on Mar. 6, 2024.

(30) Foreign Application Priority Data

Mar. 24, 2023 (JP) ................................ 2023-047885
Mar. 30, 2023 (JP) ................................ 2023-055511

(51) Int. Cl.
*F21S 41/43* (2018.01)
*F21S 41/143* (2018.01)
(Continued)

(52) U.S. Cl.
CPC ............ *F21S 41/43* (2018.01); *F21S 41/143* (2018.01); *F21S 41/148* (2018.01);
(Continued)

(58) Field of Classification Search
CPC .............................. F21S 41/686; F21S 41/675
See application file for complete search history.

(56) References Cited

U.S. PATENT DOCUMENTS

| | | | | |
|---|---|---|---|---|
| 2002/0089853 | A1* | 7/2002 | Taniuchi | F21S 41/43 362/346 |
| 2006/0120096 | A1* | 6/2006 | Naganawa | F21S 41/698 362/346 |
| 2008/0112180 | A1* | 5/2008 | Okada | F21S 41/255 362/518 |
| 2008/0253141 | A1 | 10/2008 | Nakada et al. | |

(Continued)

FOREIGN PATENT DOCUMENTS

| | | |
|---|---|---|
| JP | 2008-262755 A | 10/2008 |
| JP | 2010-192334 A | 9/2010 |

(Continued)

OTHER PUBLICATIONS

International Search Report issued on May 14, 2024 for WO 2024/203061 A1 (6 Pages).

*Primary Examiner* — Eric T Eide
(74) *Attorney, Agent, or Firm* — LICA, Inc.

(57) ABSTRACT

A vehicle headlamp includes a projection lens, a light source arranged behind a rear focal point of the projection lens, and an optical member that controls light emitted from the light source. The optical member includes a shade that is located near the rear focal point of the projection lens and shields a portion of the light emitted from the light source to form a cutoff line of a light distribution pattern, and a reflective portion that extends from the shade toward the projection lens and reflects a portion of the light emitted from the light source toward the projection lens to irradiate a region overlapping the cutoff line with the light.

18 Claims, 21 Drawing Sheets

(51) Int. Cl.

| | |
|---|---|
| ***F21S 41/148*** | (2018.01) |
| ***F21S 41/32*** | (2018.01) |
| ***F21S 41/675*** | (2018.01) |
| ***F21S 41/692*** | (2018.01) |
| ***F21W 102/15*** | (2018.01) |
| ***F21W 102/16*** | (2018.01) |
| ***F21Y 103/10*** | (2016.01) |
| ***F21Y 115/10*** | (2016.01) |

(52) U.S. Cl.

CPC ........... *F21S 41/321* (2018.01); *F21S 41/675* (2018.01); *F21S 41/692* (2018.01); *F21W 2102/15* (2018.01); *F21W 2102/16* (2018.01); *F21Y 2103/10* (2016.08); *F21Y 2115/10* (2016.08)

(56) References Cited

U.S. PATENT DOCUMENTS

| | | | | |
|---|---|---|---|---|
| 2010/0002457 | A1* | 1/2010 | Takada .................. | F21S 41/365<br>362/539 |
| 2014/0293635 | A1 | 10/2014 | Tajima | |
| 2015/0219302 | A1 | 8/2015 | Yagi et al. | |

FOREIGN PATENT DOCUMENTS

| | | | |
|---|---|---|---|
| JP | 2011-159560 | A | 8/2011 |
| JP | 2013-114770 | A | 6/2013 |
| JP | 2014-038701 | A | 2/2014 |
| JP | 2014-197505 | A | 10/2014 |
| JP | 2015-146271 | A | 8/2015 |
| JP | 2017-016913 | A | 1/2017 |

* cited by examiner

VEHICLE HEADLAMP

CROSS REFERENCE TO RELATED APPLICATIONS

This application is a continuation application of International Patent Application No. PCT/JP2024/008461, filed on Mar. 6, 2024, which claims priority from Japanese Patent Application Nos. 2023-047885 and 2023-055511, filed on Mar. 24, 2023 and Mar. 30, 2023, with the Japan Patent Office, respectively, the disclosures of which are incorporated herein in their entireties by reference.

TECHNICAL FIELD

The present disclosure relates to a vehicle headlamp.

BACKGROUND

Japanese Patent Laid-Open Publication No. 2008-262755 discloses a vehicle lighting device capable of improving the driver's visibility by blurring the cutoff line.

SUMMARY

It is desirable to form a low beam light distribution pattern having a clearly defined cutoff line in which brightness varies abruptly at the cutoff line, thereby preventing glare to drivers of preceding or oncoming vehicles.

However, forming such a clearly defined cutoff line makes it difficult to meet a demand for forming a low beam light distribution pattern with good visibility by blurring the cutoff line, as in Japanese Patent Laid-Open Publication No. 2008-262755.

Further, even though such a clearly defined cutoff line is formed, glare may still be caused to drivers of preceding or oncoming vehicles, depending on the attachment position of a vehicle headlamp on a vehicle and a positional relationship with the preceding or oncoming vehicles.

The present disclosure provides a vehicle headlamp that prevents the occurrence of glare.

Further, the present disclosure provides a vehicle headlamp capable of forming a light distribution pattern with good visibility while preventing the occurrence of glare.

A vehicle headlamp according to one aspect of the present disclosure includes a projection lens, a light source arranged behind a rear focal point of the projection lens, and an optical member that controls light emitted from the light source. The optical member includes a shade that is located near the rear focal point of the projection lens and shields a portion of the light emitted from the light source to form a cutoff line of a light distribution pattern, and a reflective portion that extends from the shade toward the projection lens and reflects a portion of the light emitted from the light source toward the projection lens to irradiate a region overlapping the cutoff line with the light.

A vehicle headlamp according to one aspect of the present disclosure includes a shade that forms a light distribution pattern that irradiates a region below a cutoff line located on or below an H-line with light by blocking at least a portion of light from a light source. The shade includes a movable part and varies a portion of the cutoff line in an up-down direction by the movable part.

According to the present disclosure, it is possible to provide a vehicle headlamp that prevents the occurrence of glare.

According to the present disclosure, it is possible to provide a vehicle headlamp capable of forming a light distribution pattern with good visibility while preventing the occurrence of glare.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
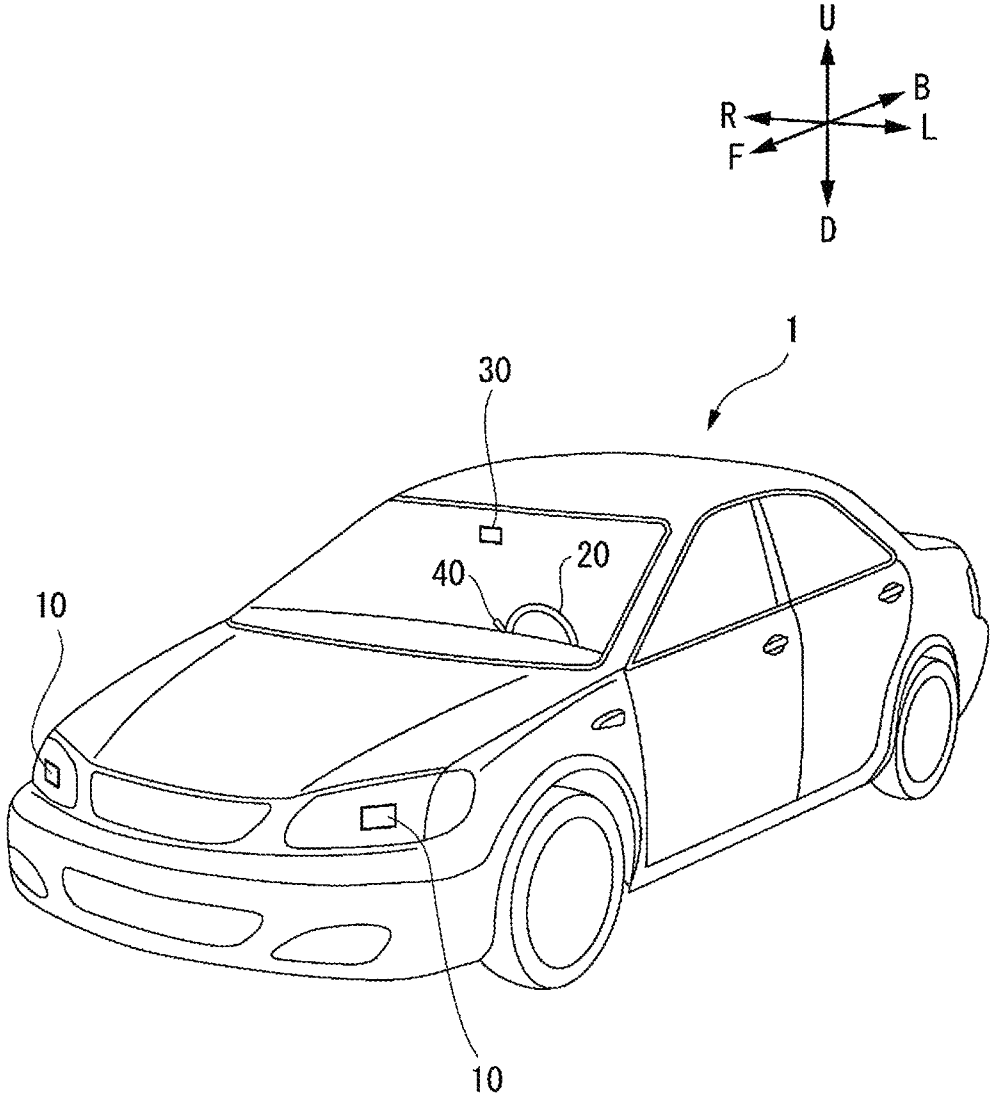
FIG. 1 is a perspective view of a vehicle equipped with a vehicle headlamp according to the present embodiment.

In the following detailed description, reference is made to the accompanying drawings, which form a part thereof. The illustrative embodiments described in the detailed description, drawings, and claims are not meant to be limiting. Other embodiments may be utilized, and other changes may be made without departing from the spirit or scope of the subject matter presented here.

Hereinafter, the present embodiment will be described with reference to the drawings. The dimension of each member illustrated in the drawings may differ from the actual dimension of each member for the convenience of description.

Further, in the description of the present embodiment, terms "left-right direction," "up-down direction," and "front-back direction" may be appropriately mentioned for the convenience of description. These directions are relative directions set for a vehicle 1 illustrated in FIG. 1. Here, the "left-right direction" refers to a direction that includes both the "leftward direction" and the "rightward direction," and corresponds to the widthwise direction of the vehicle 1. The "up-down direction" refers to a direction that includes both the "upward direction" and the "downward direction." The "front-back direction" refers to a direction that includes both the "forward direction" and the "backward direction." The front-back direction is orthogonal to both the left-right direction and the up-down direction. In the drawings, the reference character "U" indicates the upward direction. The reference character "D" indicates the downward direction. The reference character "F" indicates the forward direction. The reference character "B" indicates the backward direction. The reference character "L" indicates the leftward direction. The reference character "R" indicates the rightward direction.

Figure 2:
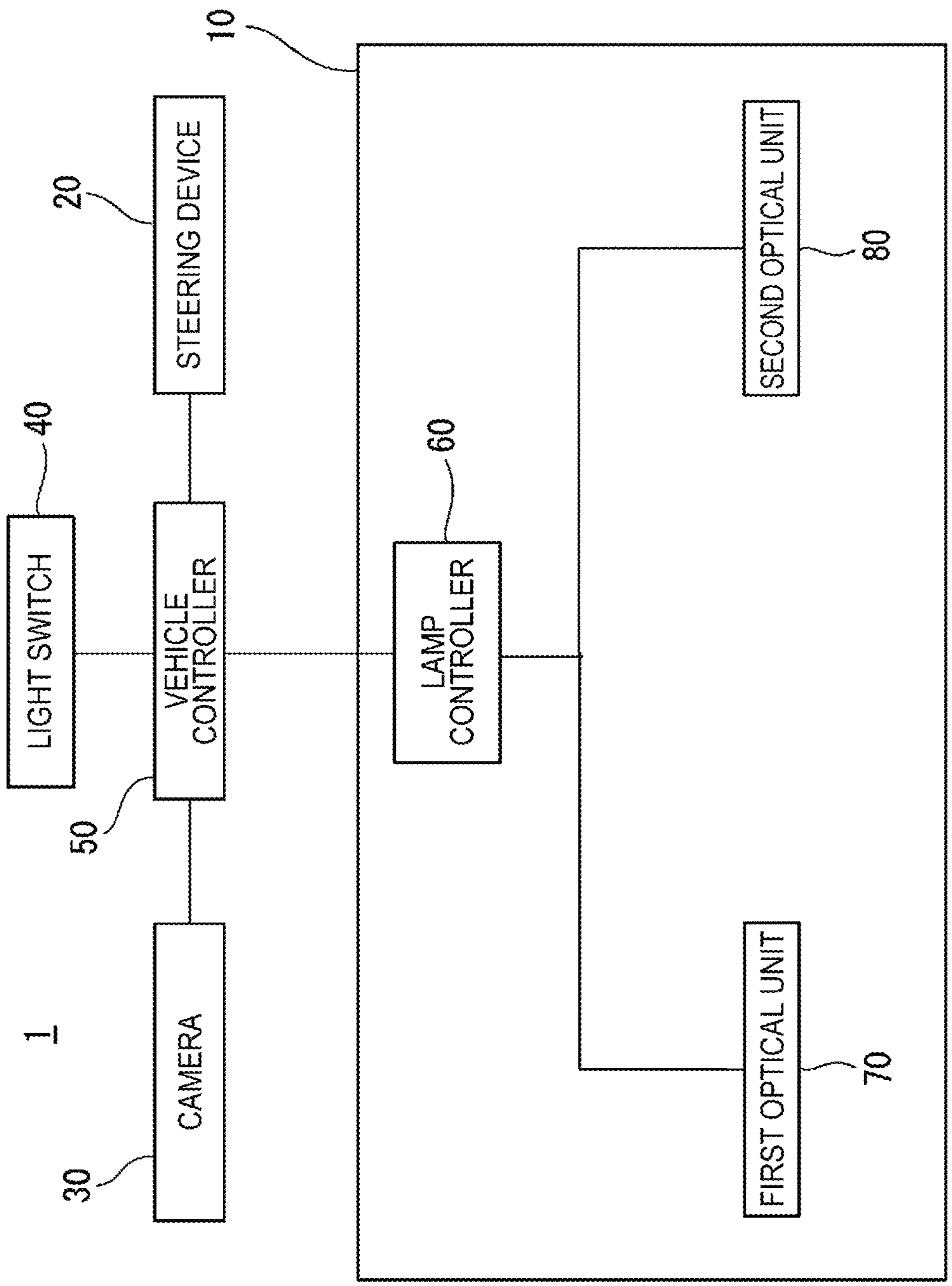
FIG. 2 is a block diagram illustrating a system configuration including the vehicle headlamp.

FIG. 1 is a perspective view of the vehicle 1 equipped with a vehicle headlamp 10. FIG. 2 is a block diagram illustrating a system configuration including the vehicle headlamp 10. The vehicle 1 is, for example, a vehicle (automobile) capable of traveling in a manual driving mode and/or an automatic driving mode.

As illustrated in FIGS. 1 and 2, the vehicle 1 includes the vehicle headlamp 10, a steering device 20, a camera 30, a light switch 40, and a vehicle controller 50. As illustrated in FIG. 1, the vehicle headlamp 10 is arranged on each of the front right and front left sides of the vehicle 1. The steering device 20 is installed, for example, in the interior of the vehicle 1. The camera 30 is arranged, for example, near a windshield. The camera 30 is located between the vehicle headlamp 10 arranged on the front right side of the vehicle 1 and the vehicle headlamp 10 arranged on the front left side of the vehicle 1 in the widthwise direction (left-right direction in FIG. 1) of the vehicle 1. The light switch 40 is installed, for example, near the steering device 20.

Figure 3:
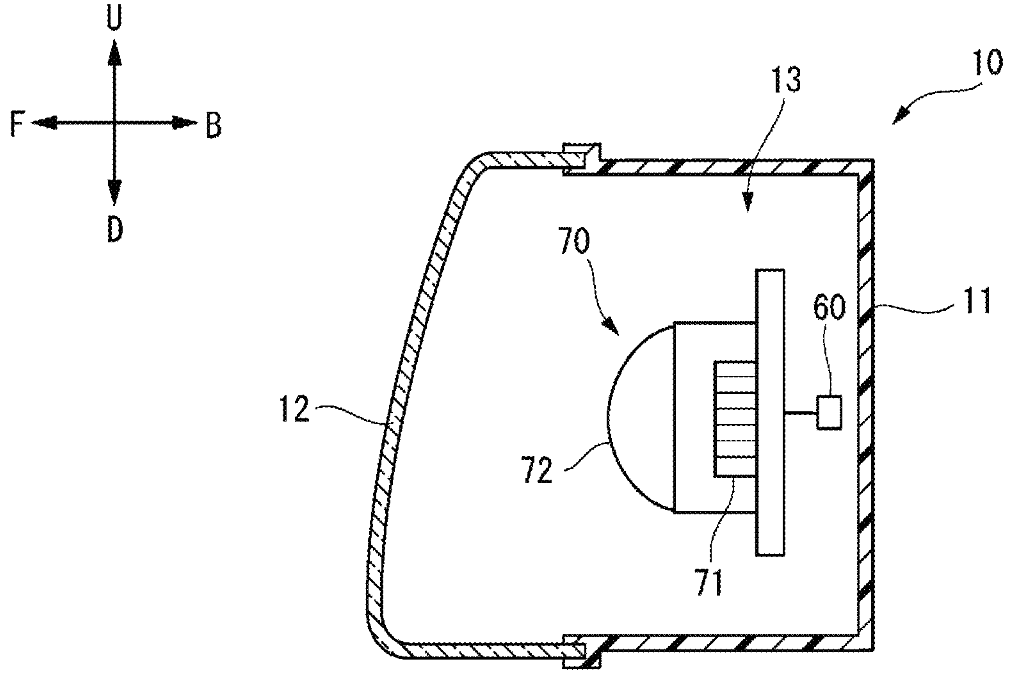
FIG. 3 is a longitudinal sectional view illustrating the configuration of a first optical unit.
Figure 4:
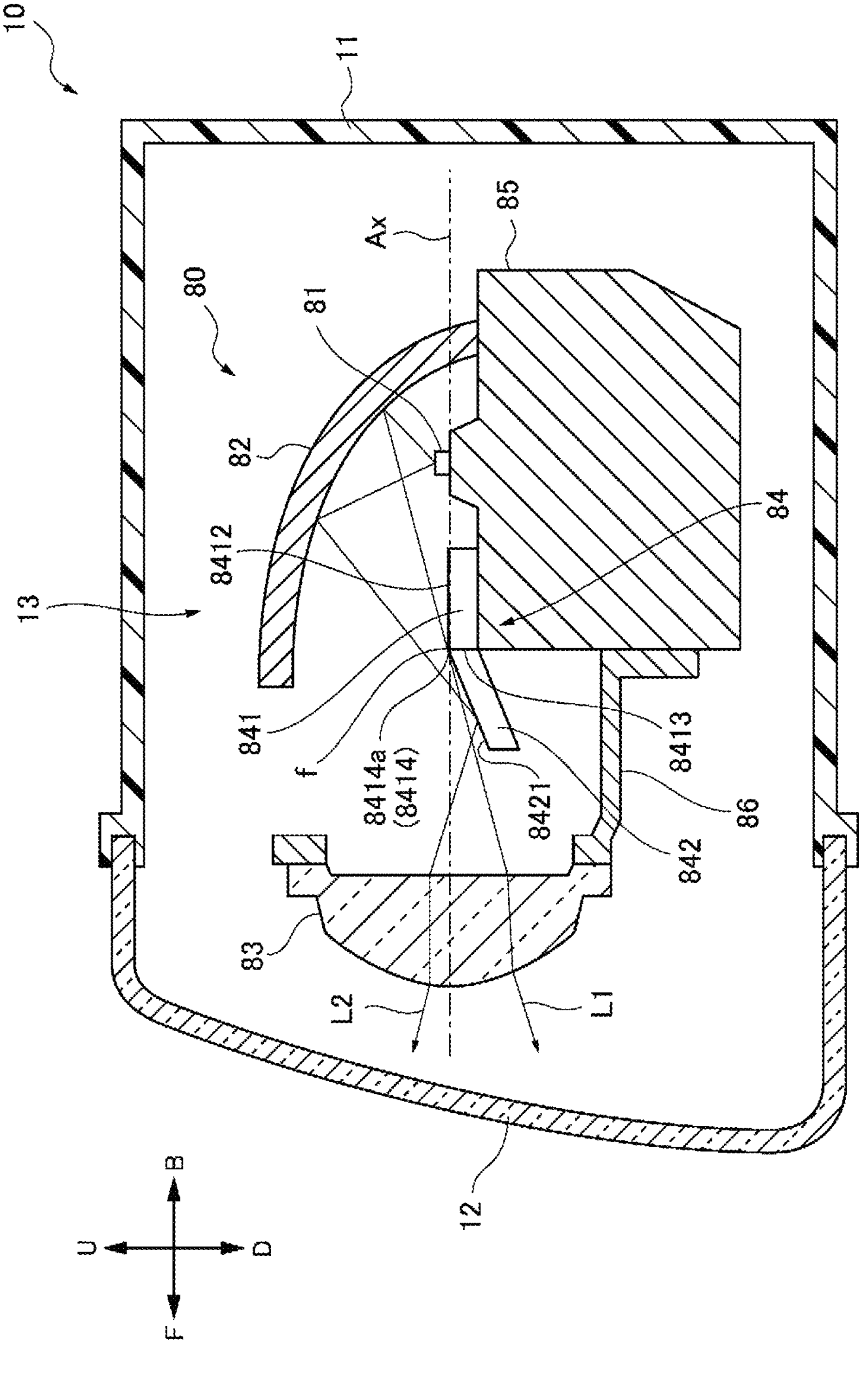
FIG. 4 is a longitudinal sectional view illustrating the configuration of a second optical unit according to a first embodiment.

As illustrated in FIG. 2, the vehicle headlamp 10 includes a lamp controller 60, a first optical unit 70, and a second optical unit 80. As illustrated in FIGS. 3 and 4, the vehicle headlamp 10 includes a lamp body 11 having an opening at the front of the vehicle headlamp 10 and a light transmitting outer cover 12 that covers the opening of the lamp body 11. The lamp controller 60, first optical unit 70, and second optical unit 80 are accommodated inside a lamp chamber 13 formed by the lamp body 11 and the outer cover 12.

Referring back to FIG. 2, the steering device 20 will be described. The steering device 20 is configured, for example, with a steering wheel.

The camera 30 is, for example, a camera including an imaging device such as a charge-coupled device (CCD) or complementary MOS (CMOS). The camera 30 acquires imaging data by capturing images of the surroundings of the vehicle 1 (e.g., the front of the vehicle 1). The camera 30 outputs the imaging data to the vehicle controller 50.

The light switch 40 is configured, for example, to switch the vehicle headlamp 10 on or off and to switch a light distribution pattern to be emitted, in response to the driver's operation of the vehicle 1. The driver of the vehicle 1 may select whether to activate a low beam or a high beam by operating the light switch 40. When the driver of the vehicle 1 operates the light switch 40, the light switch 40 generates a control signal for emitting a light distribution pattern in response to the operation, and transmits the signal to the vehicle controller 50.

The vehicle controller 50 is configured to control the traveling of the vehicle 1. The vehicle controller 50 is configured to determine the surrounding environment of the vehicle 1 based on surrounding environment information and to transmit the determined result to the lamp controller 60. The vehicle controller 50 is configured with, for example, at least one electronic control unit (ECU). The electronic control unit includes, for example, a computer system including one or more processors and one or more memories as well as an electronic circuit including active elements such as transistors and passive elements.

The vehicle controller 50 is configured to perform image analysis on the imaging data output from the camera 30. The vehicle controller 50 detects surrounding environment information indicating the surrounding environment of the vehicle 1 from the imaging data, and transmits the surrounding environment information to the lamp controller 60. The surrounding environment information includes, for example, position information on a target object (such as an oncoming vehicle, a preceding vehicle, or a road sign) located in front of the vehicle 1. The position information is, for example, an angular coordinate that indicates the azimuth of the target object as viewed from the vehicle 1 in terms of an angle.

The vehicle controller 50 transmits a signal for controlling the vehicle headlamp 10 to the lamp controller 60 based on the control signal from the light switch 40. For example, when the driver of the vehicle 1 operates the light switch 40 to emit a low beam light distribution pattern, the vehicle controller 50 receives a control signal for emitting the low beam light distribution pattern from the light switch 40, and transmits the control signal to the lamp controller 60. For example, when the driver of vehicle 1 operates the light switch 40 to emit a high beam light distribution pattern (e.g., an adaptive driving beam (ADB) light distribution pattern), the vehicle controller 50 receives a control signal for emitting the high beam light distribution pattern (e.g., ADB light distribution pattern) from the light switch 40, and transmits the control signal to the lamp controller 60. In addition, the ADB light distribution pattern refers to a high beam light distribution pattern in which a region where a target object such as a preceding vehicle or an oncoming vehicle is present is dimmed and the dimmed region varies depending on the presence and position of the target object.

The term "dimming" as used herein may include not only a reduction in the intensity of light emitted from the optical unit but also the shielding of at least a portion of light emitted from the optical unit.

The lamp controller 60 may have the same hardware configuration as the vehicle controller 50. The lamp controller 60 is configured to control the first optical unit 70 and the second optical unit 80 based on the surrounding environment information received from the vehicle controller 50.

The first optical unit 70 is configured to emit light to a region including at least a region above the cutoff line. The first optical unit 70 is capable of dimming light emitted to an arbitrary region within the light emission region, and, for example, dims light to be emitted to a region where a target object such as a preceding vehicle or an oncoming vehicle is present. The second optical unit 80 is configured to emit light to a region including at least a region below the cutoff line.

As illustrated in FIG. 3, the first optical unit 70 includes a light source 71 and a projection lens 72. The light source 71 is configured to emit light toward the projection lens 72. The light source 71 is configured, for example, with an LED array. The LED array is, for example, a light source in which a plurality of micro-LED light-emitting elements are arranged in an array. The lighting state of the multiple micro-LED light-emitting elements included in the light source 71 may be changed independently of each other. The vehicle headlamp 10 is capable of performing ON/OFF control and brightness adjustment for each micro-LED light-emitting element included in the light source 71 under the control of the lamp controller 60.

The projection lens 72 is configured to project light emitted from the light source 71 to a region in front of the vehicle 1. The projection lens 72 is, for example, an aspherical lens having a convex front surface and a flat back surface. The projection lens 72 is made of a light transmitting material, for example, a transparent resin such as acryl.

(Second Optical Unit 80 according to First Embodiment)

Figure 5:
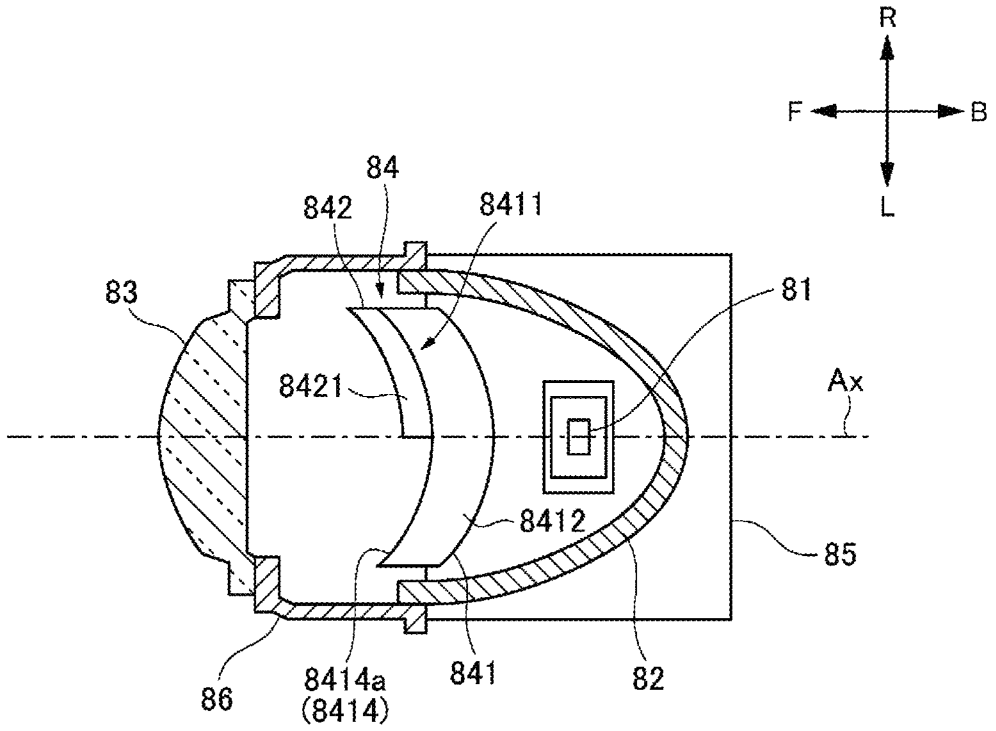
FIG. 5 is a transverse sectional view illustrating the configuration of the second optical unit.
Figure 6:
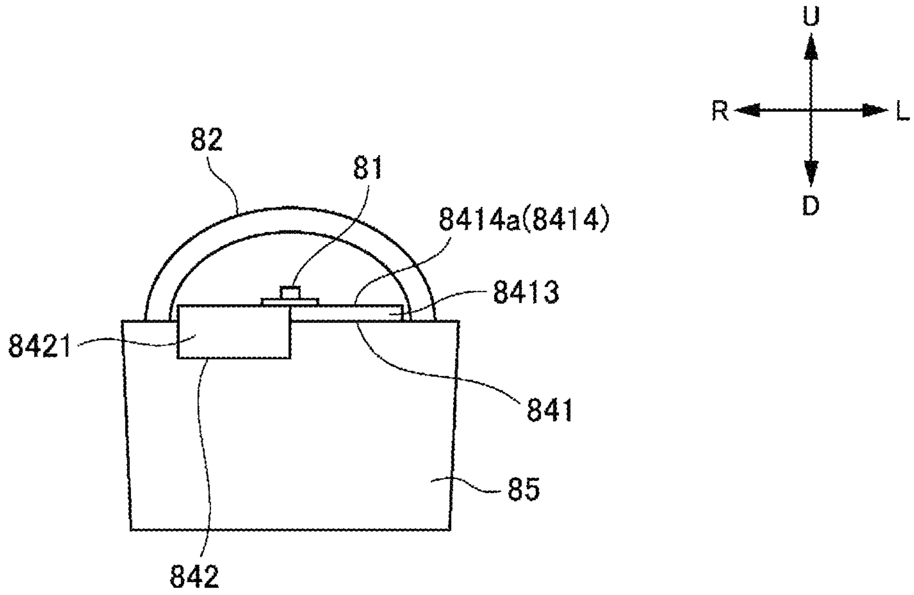
FIG. 6 is a front view of an optical member of the second optical unit as viewed from the projection lens side.

As illustrated in FIGS. 4 to 6, the second optical unit 80 includes a light source 81, a reflector 82, a projection lens 83, and an optical member 84.

The light source 81 is arranged behind the rear focal point of the projection lens 83. The light source 81 is, for example, an LED. The light source 81 is disposed on the upper surface of a support member 85 via a circuit board (not illustrated) in a posture in which a light emitting surface thereof faces upward. In addition to an LED, a laser diode (LD) element or an electroluminescence (EL) element may also be used for the light source 81. The support member 85 is a metallic member, and is, for example, integrally formed with a heat sink.

The reflector 82 is provided on the upper surface of the support member 85 behind the light source 81. A substantially ellipsoidal reflective surface is formed on the inner peripheral surface of the reflector 82. The light source 81 is positioned near a first focal point of the inner peripheral ellipsoidal surface of the reflector 82. Light from the light source 81 is reflected forward by the reflective surface of the reflector 82 to the vicinity of the optical axis Ax extending in the vehicle front-back direction, and is substantially converged at a second focal point of the inner peripheral ellipsoidal surface of the reflector 82 in the vertical cross section including the optical axis Ax.

The expression "near the focal point" as used herein refers not only to the position at which the focal point exists but also includes positions around the focal point.

The projection lens 83 is located on the optical axis Ax. The projection lens 83 is configured to project light, emitted from the light source 81 and reflected by the reflector 82, to a region in front of the vehicle 1. The projection lens 83 is positioned such that the rear focal point thereof is located at the second focal point of the inner peripheral ellipsoidal surface of the reflector 82. The projection lens 83 forwardly projects an inverted image of an object on the focal plane including the rear focal point. The projection lens 83 is, for example, an aspherical lens having a convex front surface and a flat back surface. The projection lens 83 is made of a light transmitting material, for example, a transparent resin such as acryl. The projection lens 83 is attached to a lens holder 86. The lens holder 86 is attached to the front surface of the support member 85.

The optical member 84 is configured to control light emitted from the light source 81 and reflected by the reflector 82. The optical member 84 includes a shade 841 and a reflective portion 842. The shade 841 is located near the rear focal point f of the projection lens 83. Specifically, a front end 8411 (see, e.g., FIG. 5) of the shade 841 is located near the rear focal point f of the projection lens 83. In this example, the shade 841 is disposed on the upper surface of the support member 85. The shade 841 shields a portion of light emitted from the light source 81 and reflected by the reflector 82 to form the cutoff line of a light distribution pattern.

As illustrated in FIG. 5, the shade 841 extends in the left-right direction and is shaped such that the front end 8411 of the shade 841 is curved along the rear focal plane of the projection lens 83 in a plan view. In this example, as illustrated in FIG. 4, the shade 841 has an upper surface 8412, a front end surface 8413, and a corner 8414. The upper surface 8412 extends along a plane extending in the direction of the optical axis Ax and in the left-right direction. The front end surface 8413 extends in a direction orthogonal to the upper surface 8412. The corner 8414 is formed by the upper surface 8412 and the front end surface 8413. An edge 8414*a* of the corner 8414 of the shade 841 (i.e., the ridge between the upper surface 8412 and the front end surface 8413) is curved along the rear focal plane of the projection lens 83 in a plan view.

The reflective portion 842 is configured to reflect a portion of light, emitted from the light source 81 and reflected by the reflector 82, toward the projection lens 83, so as to irradiate a region overlapping the cutoff line of the light distribution pattern formed by the shade 841 with the light. Specifically, the reflective portion 842 extends from the shade 841 toward the projection lens 83 and is located in front of the rear focal point f of the projection lens 83. The reflective portion 842 may be integrally formed with the shade 841, or may be formed separately from the shade 841 and then connected to the shade 841.

The reflective portion 842 has a reflective surface 8421 on the upper surface thereof. In this example, as illustrated in FIG. 4, the reflective surface 8421 extends obliquely downward from the edge 8414*a* of the corner 8414 of the shade 841 (i.e., the ridge between the upper surface 8412 and the front end surface 8413) toward the projection lens 83.

As illustrated in FIG. 5, the reflective portion 842 is curved along the front end 8411 of the shade 841 in a plan view.

Further, as illustrated in FIGS. 5 and 6, the reflective portion 842 is provided at the right side of the lateral center (optical axis Ax) of the projection lens 83 when viewed from the front of the projection lens 83. In this example, the reflective portion 842 extends rightward from the lateral center of the projection lens 83. The reflective portion 842 may be configured to extend rightward from a position located farther from the lateral center of the projection lens 83.

Next, a low beam light distribution pattern PL emitted from the vehicle headlamp 10 during low beam lighting will be described with reference to FIG. 7. In the present embodiment, a case where the vehicle 1 is traveling in the right lane will be described. The term "low beam lighting" refers to a situation in which the driver of the vehicle 1 has operated the light switch 40 to emit the low beam light distribution pattern PL.

Figure 7:
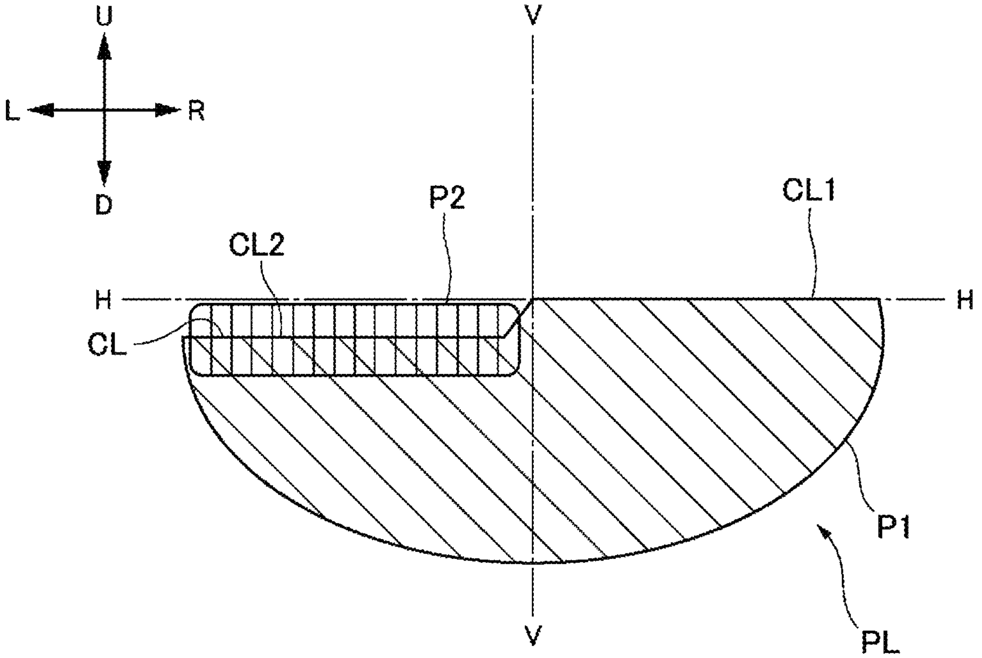
FIG. 7 is a diagram illustrating a low beam light distribution pattern during low beam lighting.

FIG. 7 illustrates the low beam light distribution patterns PL as projected onto a virtual vertical screen at a predetermined position in front of the vehicle 1 (e.g., position 25 meters ahead of the vehicle 1). Further, FIG. 7 also illustrates a V-V line indicating the vertical direction (up-down direction in FIG. 7) at the irradiation range center of the vehicle headlamp 10 and an H-H line extending in the horizontal direction (left-right direction in FIG. 4) orthogonal to the V-V line.

As illustrated in FIG. 7, during low beam lighting, the vehicle headlamp 10 emits the low beam light distribution pattern PL by turning on the second optical unit 80. The low beam light distribution pattern PL is formed by a first light distribution pattern P1 and a second light distribution pattern P2. The first light distribution pattern P1 has a cutoff line CL and covers a region below the cutoff line CL. The second light distribution pattern P2 covers a region overlapping the cutoff line CL of the first light distribution pattern P1.

As illustrated in FIG. 4, a portion of light emitted from the light source 81 is reflected by the reflector 82 and is concentrated near the front end 8411 (see, e.g., FIG. 5) of the shade 841. A part L1 of the light concentrated near the front end 8411 of the shade 841 is projected forward from the headlamp while being inverted vertically and horizontally by the projection lens 83. At this time, since a portion of light is blocked by the shade 841, the first light distribution pattern P1 having the cutoff line CL at the upper edge thereof is formed. The shape of the cutoff line CL corresponds to the edge 8414*a* of the corner 8414 of the shade 841.

Further, a part L2 of the light reflected by the reflector 82 and concentrated near the shade 841, which is concentrated in front of the shade 841, is reflected by the reflective surface 8421 of the reflective portion 842. Thus, the second light distribution pattern P2 overlapping the cutoff line CL of the first light distribution pattern P1 is formed.

The reflective surface 8421 is provided at a position offset from the rear focal point f of the projection lens 83. Therefore, even if the light directed from the reflective surface 8421 is projected forward through the projection lens 83, it does not form a sharp image but rather a blurred image. Therefore, the second light distribution pattern P2 appears blurred.

In this example, since the reflective portion 842 is provided at the right side of the lateral center of the projection lens 83, the second light distribution pattern P2 is formed to overlap a second portion CL2 of the cutoff line CL at the left side (the opposite lane side) of the V-V line.

In this way, since the second light distribution pattern P2 is not emitted to a first portion CL1 of the cutoff line CL of the first light distribution pattern P1 located at the right side (the host vehicle lane side) of the V-V line, the first portion CL1 of the cutoff line CL exhibits a sharp contrast between light and dark. In the meantime, since the second light distribution pattern P2 is emitted to the second portion CL2 of the cutoff line CL located at the opposite lane side, the second portion CL2 of the cutoff line CL appears blurred than the first portion CL1 of the cutoff line CL.

Incidentally, it is desirable to form a low beam light distribution pattern having a clearly defined cutoff line in which light and dark abruptly vary, thereby preventing glare to drivers of preceding or oncoming vehicles. However, in the meantime, there is also a demand for forming a low beam light distribution pattern with good visibility by blurring the cutoff line.

According to the vehicle headlamp 10 of the present embodiment, in the low beam light distribution pattern PL, the first portion CL1 of the cutoff line CL at the host vehicle lane side appears sharp, thereby preventing glare for preceding or oncoming vehicles. In the meantime, the second portion CL2 of the cutoff line CL at the opposite lane side appears more blurred than the first part CL1, thereby improving visibility. Accordingly, it is possible to provide the vehicle headlamp 10 capable of forming the low beam light distribution pattern PL with good visibility while preventing the occurrence of glare.

Further, in the present embodiment, since the reflective portion 842 is curved along the front end 8411 of the shade 841, it is possible to form the second light distribution pattern P2 having a shape that follows the cutoff line CL of the first light distribution pattern P1.

Further, in the present embodiment, the reflective portion 842 is located at the right side of the lateral center of the projection lens 83 when viewed from the front of the projection lens 83. This enables the first portion CL1 of the cutoff line CL (at the host vehicle lane side of the V-V line) to appear sharp, and the second portion CL2 (at the opposite lane side of the V-V line) to appear blurred.

(Second Optical Unit 80A according to Modification 1)

Figure 8:
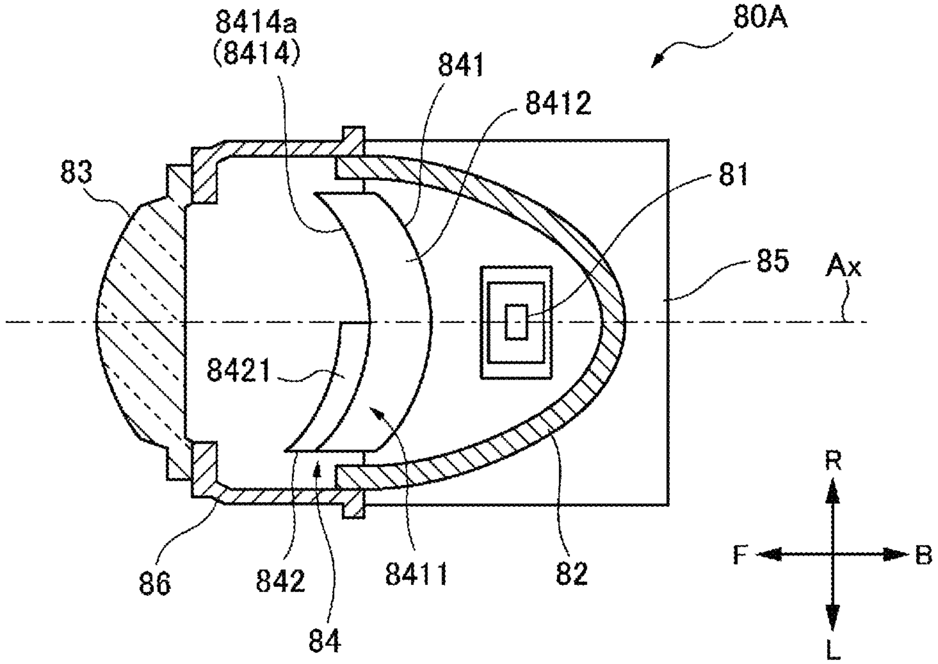
FIG. 8 is a transverse sectional view illustrating the configuration of a second optical unit according to Modification 1.
Figure 9:
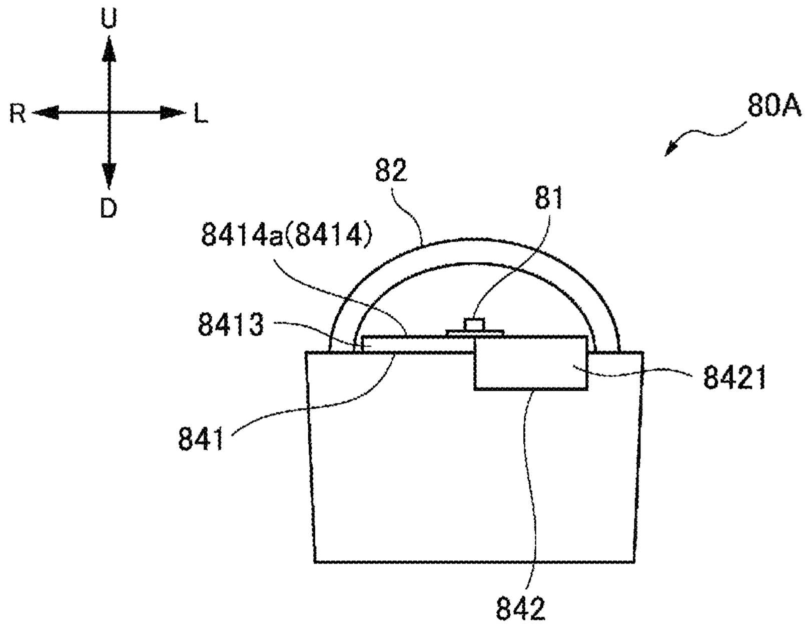
FIG. 9 is a front view of an optical member of the second optical unit of FIG. 8 as viewed from the projection lens side.

The position of the reflective portion 842 is not limited to the right side of the lateral center of the projection lens 83. For example, FIGS. 8 and 9 illustrate the configuration of a second optical unit 80A according to Modification 1. As illustrated in FIGS. 8 and 9, the second optical unit 80A may include the reflective portion 842 provided at the left side of the lateral center of the projection lens 83 when viewed from the front of the projection lens 83. The configuration of the second optical unit 80A is the same as that of the second optical unit 80 illustrated in FIG. 4 except for the position of the reflective portion 842, and thus, a detailed description thereof is omitted.

Figure 10:
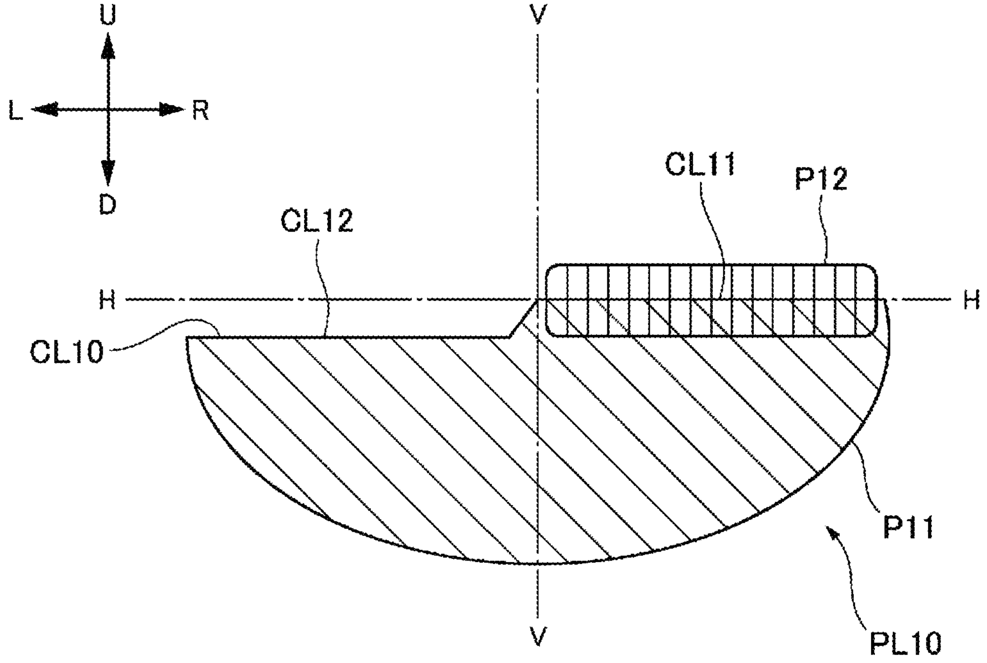
FIG. 10 is a diagram illustrating a low beam light distribution pattern during low beam lighting formed by the second optical unit of FIG. 8.

FIG. 10 illustrates a low beam light distribution pattern PL10 formed by the second optical unit 80A illustrated in FIG. 8 during low beam lighting.

As illustrated in FIG. 10, during low beam lighting, the vehicle headlamp 10 emits the low beam light distribution pattern PL10 by turning on the second optical unit 80A. The low beam light distribution pattern PL10 is formed by a first light distribution pattern P11 and a second light distribution pattern P12. The first light distribution pattern P11 has a cutoff line CL10, and covers a region below the cutoff line CL10. The second light distribution pattern P12 covers a region overlapping the cutoff line CL10 of the first light distribution pattern P11.

In this example, since the reflective portion 842 is provided at the left side of the lateral center of the projection lens 83, the second light distribution pattern P12 is formed to overlap a first portion CL11 of the cutoff line CL10 at the right side (the host vehicle lane side) of the V-V line.

This enables a second portion CL12 of the cutoff line CL (at the opposite lane side of the V-V line) to appear sharp, and the first portion CL11 (at the host vehicle lane side of the V-V line) to appear blurred.

(Second Optical Unit 80B according to Modification 2)

Figure 11:
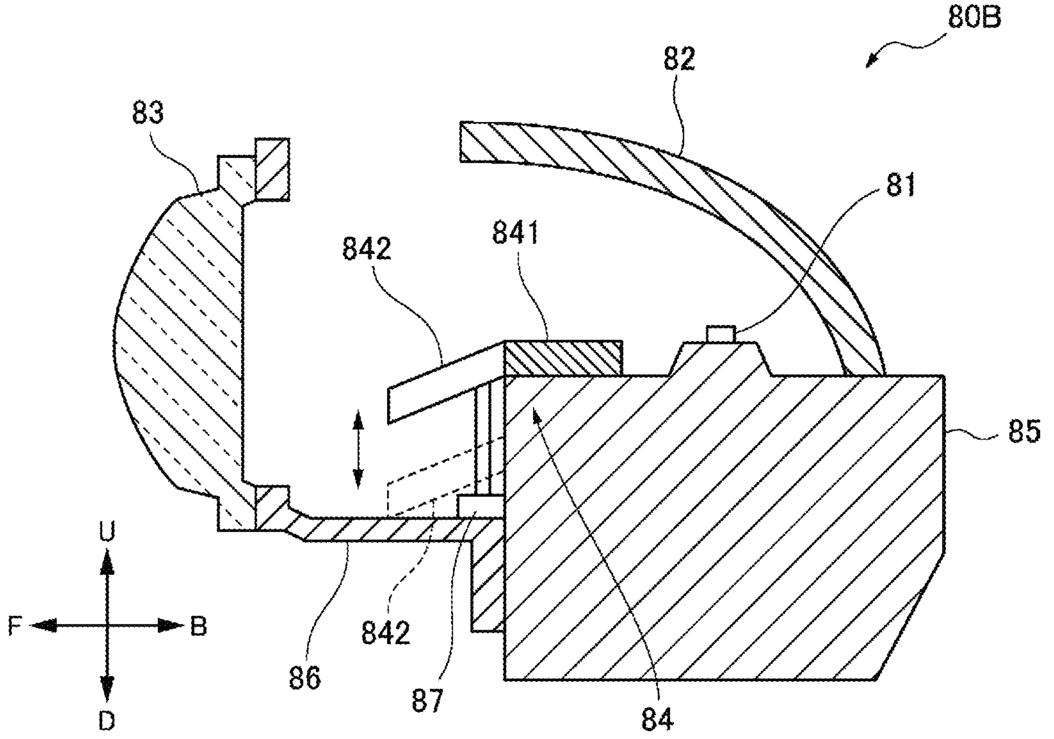
FIG. 11 is a longitudinal sectional view illustrating the configuration of a second optical unit according to Modification 2.

The reflective portion 842 is fixed to the shade 841, but may be configured to be movable up and down. For example, FIG. 11 illustrates a second optical unit 80B according to Modification 2. The second optical unit 80B includes the reflective portion 842 that is movable up and down. The configuration of the second optical unit 80B is the same as that of the second optical unit 80 illustrated in FIG. 4 except that the reflective portion 842 is movable up and down, and thus, a detailed description thereof is omitted.

The second optical unit 80B includes a drive mechanism 87, and the reflective portion 842 moves and down between a first position (indicated by the solid line in the drawing) and a second position (indicated by the broken line in the drawing) by means of the drive mechanism 87.

The first position is set to a position where the reflective portion 842 reflects light reflected by the reflector 82 toward the projection lens 83 to irradiate a region overlapping the cutoff line with the light. The second position is set, for example, to a position where light reflected by the reflector 82 does not reach the reflective portion 842, or to a position where a region below the cutoff line is irradiated with light reflected by the reflective portion 842.

For example, when an ADB light distribution pattern is to be formed as a high beam light distribution pattern, the reflective portion 842 may be configured to move between the first position and the second position depending on the position of a preceding vehicle or an oncoming vehicle in front of the vehicle 1.

Figure 12:
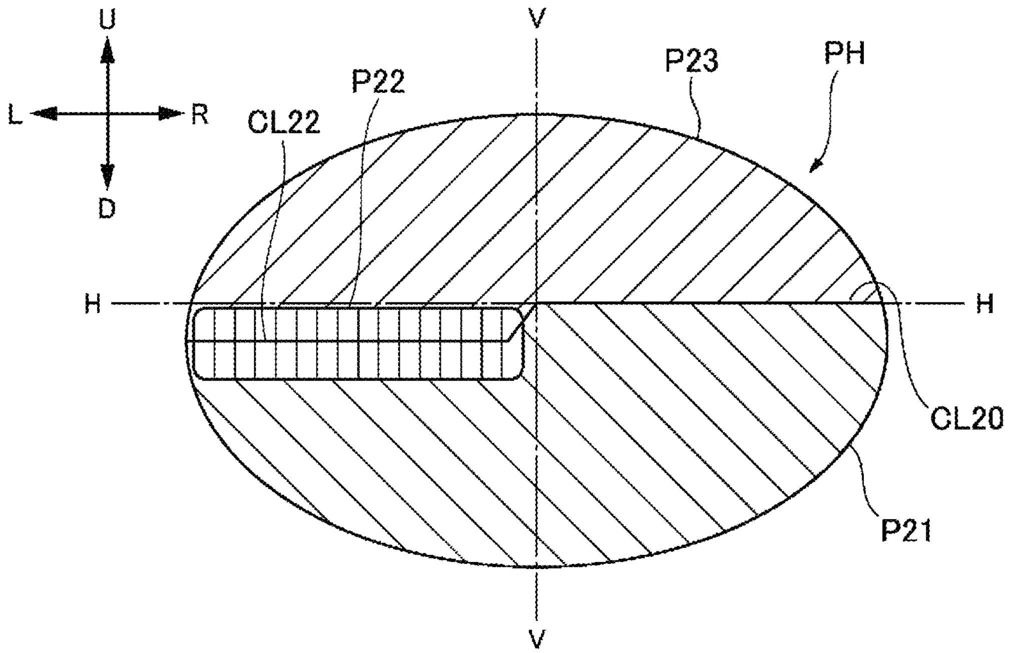
FIG. 12 is a diagram illustrating a high beam light distribution pattern during high beam lighting formed by a vehicle headlamp including the second optical unit of FIG. 11.
Figure 13:
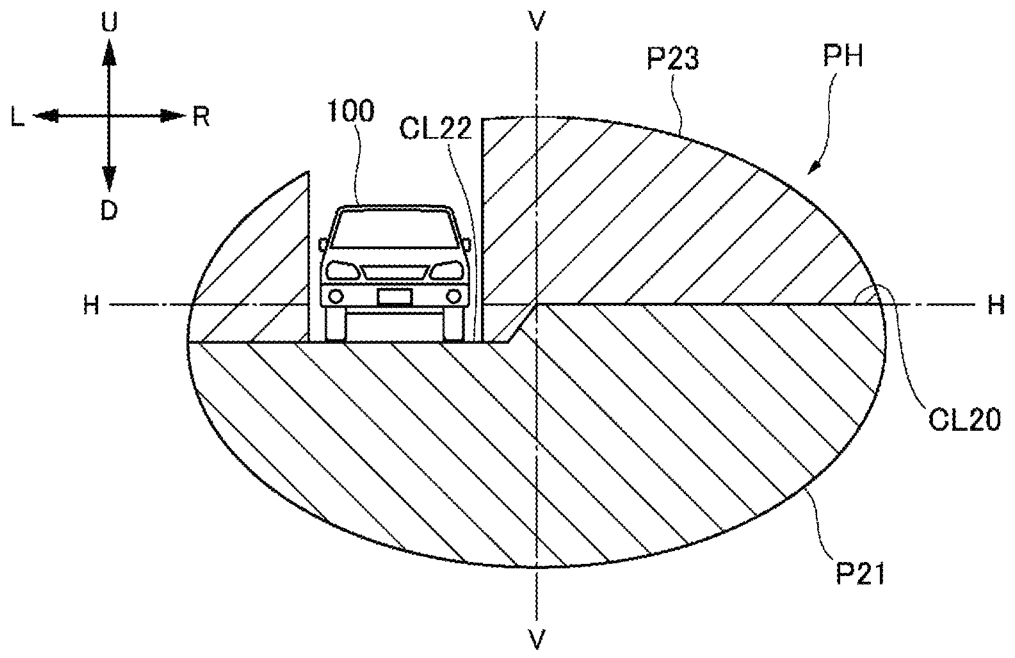
FIG. 13 is a diagram illustrating a high beam light distribution pattern during high beam lighting formed by the vehicle headlamp including the second optical unit of FIG. 11 when there is an oncoming vehicle ahead.

FIGS. 12 and 13 illustrate a high beam light distribution pattern PH formed by the vehicle headlamp 10 during high beam lighting. The term "high beam lighting" refers to a situation in which the driver of the vehicle 1 has operated the light switch 40 to emit the high beam light distribution pattern PH. During high beam lighting, the vehicle headlamp 10 emits the high beam light distribution pattern PH by turning on the first optical unit 70 and the second optical unit 80B. In this example, the high beam light distribution pattern PH is an ADB light distribution pattern.

FIG. 12 illustrates the high beam light distribution pattern PH when there is no preceding vehicle or oncoming vehicle in front of the vehicle 1. When there is no preceding vehicle or oncoming vehicle in front of the vehicle 1 during high beam lighting, the high beam light distribution pattern PH is formed by first and second light distribution patterns P21 and P22 emitted from the second optical unit 80B and a third light distribution pattern P23 emitted from the first optical unit 70.

The first light distribution pattern P21 has a cutoff line CL20, and covers a region below the cutoff line CL20. The second light distribution pattern P22 covers a region overlapping the cutoff line CL20 of the first light distribution pattern P21. The third light distribution pattern P23 covers a region above the cutoff line CL20.

When there is no preceding vehicle or oncoming vehicle in front of the vehicle 1, the lamp controller 60 controls the drive mechanism 87 such that the reflective portion 842 is located at the first position. Thus, a portion of light, reflected by the reflector 82 and concentrated in front of the shade 841, is reflected by the reflective surface 8421 of the reflective portion 842, thereby forming the second light distribution pattern P22 that overlaps the cutoff line CL20.

In the meantime, FIG. 13 illustrates the high beam light distribution pattern PH when there is an oncoming vehicle 100 in front of the vehicle 1. When there is the oncoming vehicle 100 in front of the vehicle 1 during high beam lighting, the high beam light distribution pattern PH is formed by the first light distribution pattern P21 emitted from the second optical unit 80 and the third light distribution pattern P23 emitted from the first optical unit 70.

Specifically, when there is the oncoming vehicle 100 in front of the vehicle 1, the camera 30 outputs imaging data regarding the oncoming vehicle 100 to the vehicle controller 50. The vehicle controller 50 detects surrounding environment information, including position information on the oncoming vehicle 100, from the imaging data output from the camera 30, and transmits the surrounding environment information to the lamp controller 60. The lamp controller 60 controls the first optical unit 70 so as not to emit light toward the oncoming vehicle 100 based on the surrounding environment information received from the vehicle controller 50. In the example illustrated in FIG. 13, the surrounding region of the oncoming vehicle 100 is shielded by this control.

Further, the lamp controller 60 controls the second optical unit 80B such that the drive mechanism 87 is driven to move the reflective portion 842 from the first position to the second position. Thus, a portion of light, reflected by the reflector 82 and concentrated in front of the shade 841, is not reflected to overlap the cutoff line CL20 by the reflective portion 842, and therefore, the second light distribution pattern P22 is not formed.

That is, during high beam lighting, the surrounding region of the oncoming vehicle 100 is shaded, and a second portion CL22, located below the oncoming vehicle 100, of the cutoff line CL20 of the first light distribution pattern P21 has a clear contrast between light and dark. Thus, even while the high beam light distribution pattern PH is being emitted, it is possible to prevent the occurrence of glare to the passengers of the oncoming vehicle 100 due to the cutoff line CL20 of the first light distribution pattern P21.

(Optical Unit 90 According to Second Embodiment)

In the first embodiment described above, the first optical unit 70 and the second optical unit 80 are separate components. However, the vehicle headlamp 10 may include a single optical unit capable of implementing the functions of both the first optical unit 70 and the second optical unit 80.

Figure 14:
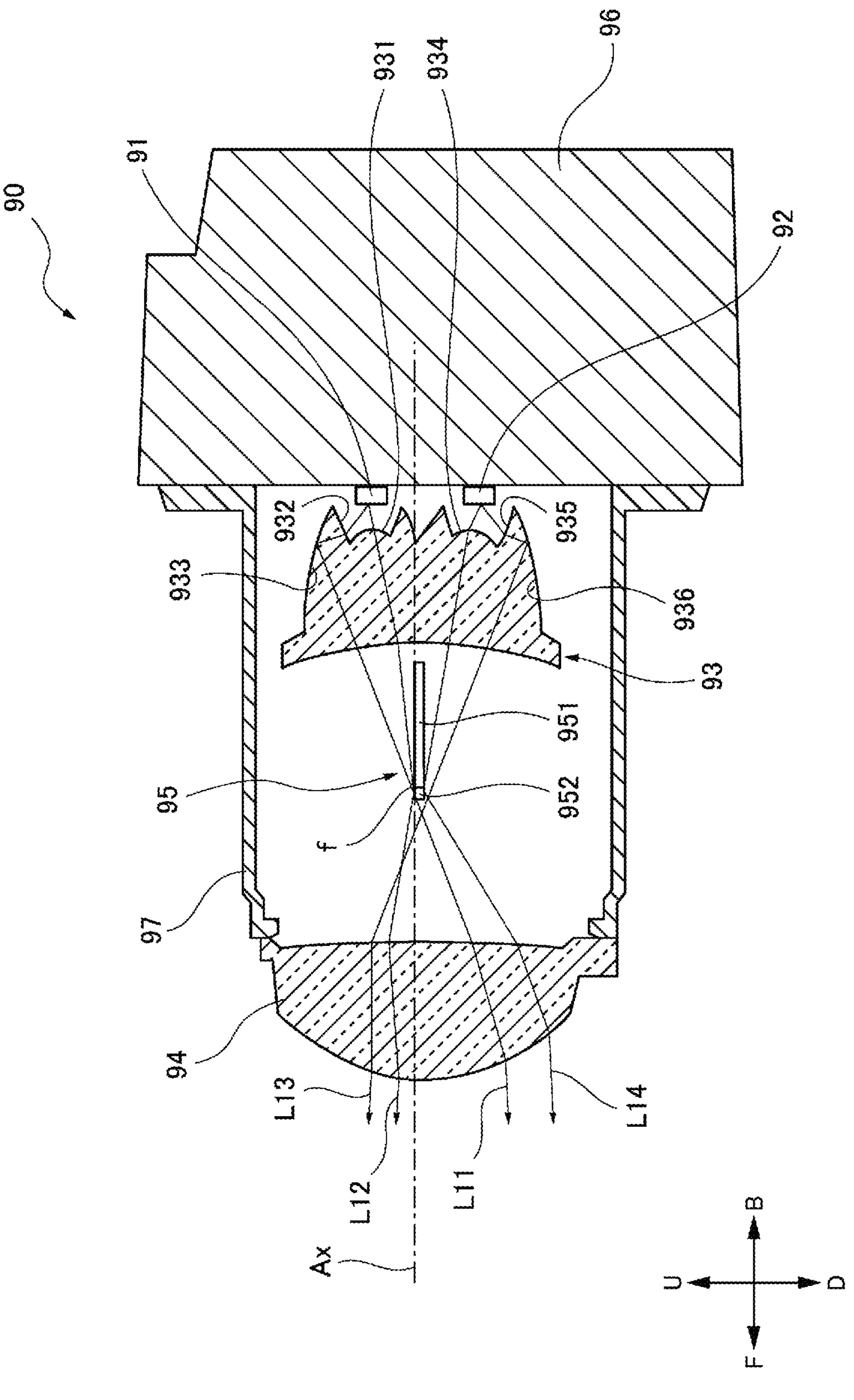
FIG. 14 is a longitudinal sectional view illustrating the configuration of a single optical unit capable of implementing the functions of both the first optical unit and the second optical unit according to a second embodiment.
Figure 15:
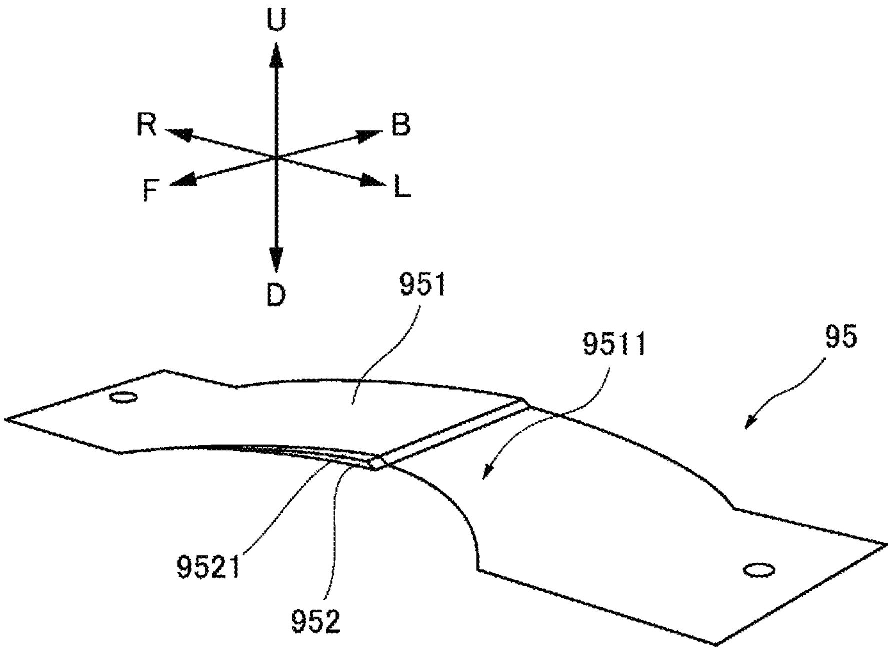
FIG. 15 is a perspective view of an optical member of the optical unit of FIG. 14 as viewed from the projection lens side.
Figure 16:
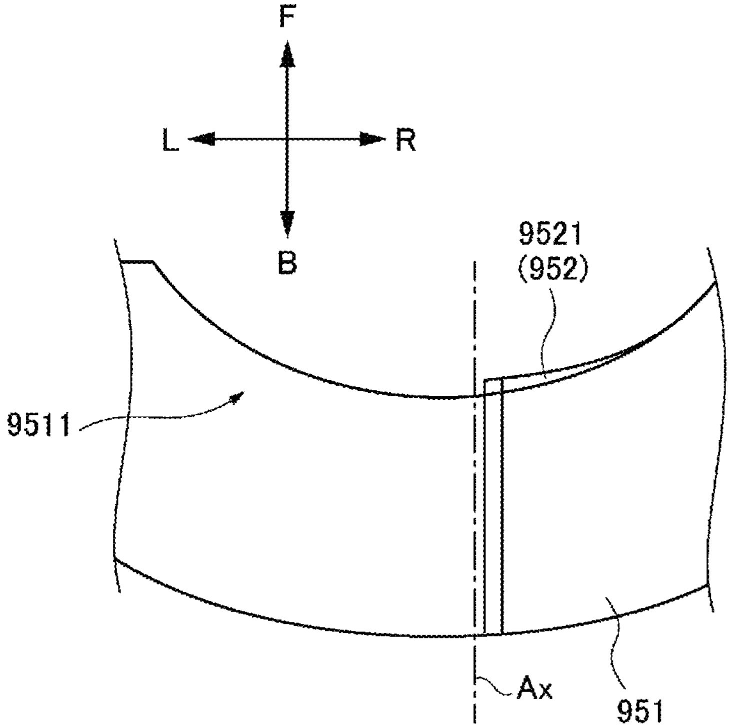
FIG. 16 is a plan view of a portion of the optical member of FIG. 15 as viewed from above.

For example, FIGS. 14 to 16 illustrate the configuration of an optical unit 90 according to a second embodiment. The optical unit 90 is configured to realize the functions of both the first optical unit 70 and the second optical unit 80.

As illustrated in FIG. 14, the optical unit 90 includes a first light source 91, a second light source 92, a light guide (primary lens) 93, a projection lens 94, and an optical member 95.

The first light source 91 and the second light source 92 are arranged behind the rear focal point f of the projection lens 94. The first light source 91 and the second light source 92 are disposed on a support member 96 via a circuit board (not illustrated) in a posture in which light emitting surfaces thereof face the projection lens 94. The first light source 91 is controlled to be turned on during both low beam lighting and high beam lighting. The support member 96 is a metallic member, and is, for example, integrally formed with a heat sink.

Light emitted from the first light source 91 forms a first light distribution pattern that has a first cutoff line and is emitted to a region below the first cutoff line, and a second light distribution pattern emitted to overlap the first cutoff line. The second light source 92 is controlled to be turned on during high beam lighting. Light emitted from the second light source 92 forms a third light distribution pattern that has a second cutoff line and is emitted to a region including at least a region above the first cutoff line of the first light distribution pattern.

The first light source 91 and the second light source 92 are, for example, LEDs. In addition to LEDs, LD elements or EL elements may also be used for the first and second light sources 91 and 92.

The light guide 93 is arranged in front of the first and second light sources 91 and 92. Light emitted from the first and second light sources 91 and 92 propagates through the light guide 93 and is emitted from the light guide 93 toward the projection lens 94. The light guide 93 is made of a light transmitting material, for example, a transparent resin such as acryl.

The light guide 93 includes a first incident portion 931, a second incident portion 932, and a first reflective surface 933. The first incident portion 931 is provided at a position facing the first light source 91. The second incident portion 932 is provided as a vertical wall surrounding the first incident portion 931.

Light, incident on the first incident portion 931 from the first light source 91, is refracted forward to the vicinity of the optical axis Ax extending in the vehicle front-back direction, and is substantially converged near the rear focal point f of the projection lens 94 in the vertical cross section including the optical axis Ax. Further, light, incident on the second incident portion 932 from the first light source 91, is refracted forward to the vicinity of the optical axis Ax by the first reflective surface 933, and is substantially converged near the rear focal point f of the projection lens 94 in the vertical cross section including the optical axis Ax.

The light guide 93 further includes a third incident portion 934, a fourth incident portion 935, and a second reflective surface 936. The third incident portion 934 is provided at a position facing the second light source 92. The fourth incident portion 935 is provided as a vertical wall surrounding the second incident portion 932.

Light, incident on the third incident portion 934 from the second light source 92, is refracted forward to the vicinity of the optical axis Ax, and is substantially converged near the rear focal point f of the projection lens 94 in the vertical cross section including the optical axis Ax. Further, light, incident on the fourth incident portion 935 from the second light source 92, is reflected to the vicinity of the optical axis Ax by the second reflective surface 936, and is substantially converged near the rear focal point f of the projection lens 94 in the vertical cross section including the optical axis Ax.

The projection lens 94 is arranged on the optical axis Ax. The projection lens 94 is configured to project light emitted from the first and second light sources 91 and 92 onto a region in front of the vehicle 1. The projection lens 94 forwardly projects an inverted image on the focal plane including the rear focal point. The projection lens 94 is, for example, an aspherical lens having a convex front surface and a flat back surface. The projection lens 94 is made of a light transmitting material, for example, a transparent resin such as acryl. The projection lens 94 is attached to a lens holder 97. The lens holder 97 is attached to the front surface of the support member 96.

The optical member 95 is configured to control light emitted from the first and second light sources 91 and 92, propagated through the light guide 93, and emitted from the light guide 93. In this example, the optical member 95 is supported by a support member (not illustrated). The optical element 95 includes a shade 951 and a reflective portion 952.

The shade 951 is positioned near the rear focal point f of the projection lens 94. Specifically, a front end 9511 (see, e.g., FIG. 15) of the shade 951 is positioned near the rear focal point f of the projection lens 94. The shade 951 shields a portion of light emitted from the first light source 91, propagated through the light guide 93, and emitted from the light guide 93, thereby forming the first cutoff line of the first light distribution pattern. Further, the shade 951 shields a portion of light, emitted from the second light source 92, propagated through the light guide 93, and emitted from the light guide 93, thereby forming the second cutoff line of the third light distribution pattern.

The shade 951 has a thin plate shape and extends in the left-right direction, as illustrated in FIG. 15. The shade 951 is shaped such that the front end 9511 of the shade 951 is curved along the rear focal plane of the projection lens 94 in a plan view.

The reflective portion 952 is configured to reflect a portion of light, emitted from the first light source 91, propagated through the light guide 93, and emitted from the light guide 93, toward the projection lens 94, so as to irradiate a region overlapping the first cutoff line of the first light distribution pattern formed by the shade 951 with the light.

The reflective portion 952 extends from the shade 951 toward the projection lens 94. The reflective portion 952 may be integrally formed with the shade 951, or may be formed separately from the shade 951 and then connected to the shade 951.

As illustrated in FIGS. 15 and 16, the reflective portion 952 has a reflective surface 9521 on the upper surface thereof. The reflective portion 952 is curved along the front end 9511 of the shade 951 in a plan view. Further, the reflective portion 952 is provided at the right side of the lateral center (optical axis Ax) of the projection lens 94 when viewed from the front of the projection lens 94. In this example, the reflective portion 952 extends from approximately the lateral center of the projection lens 94 to the middle of the shade 951, and does not reach the end of the shade 951.

Figure 17:
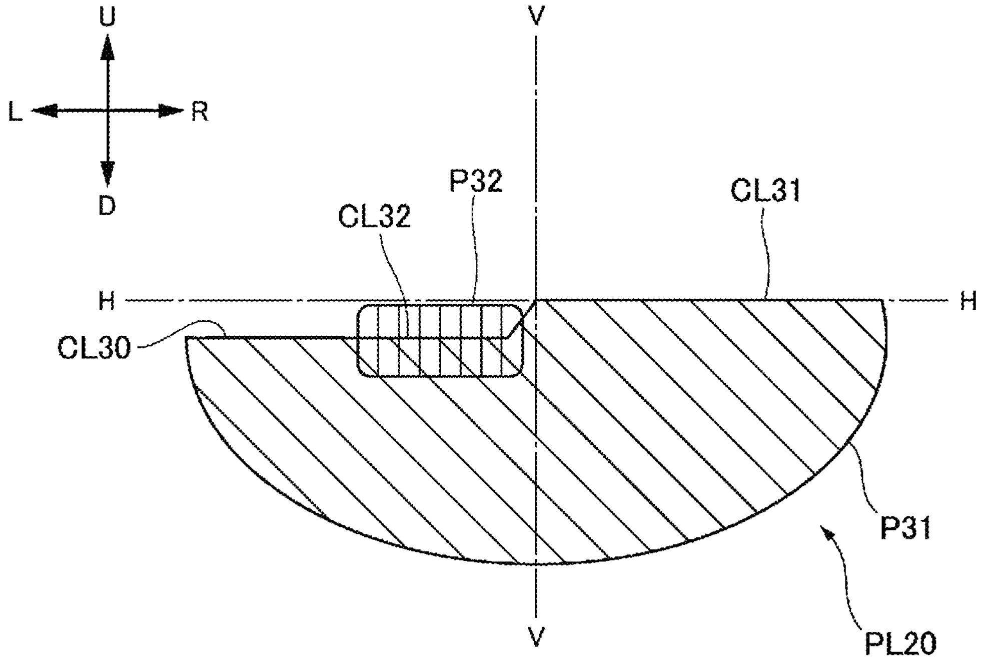
FIG. 17 is a diagram illustrating a low beam light distribution pattern during low beam lighting formed by the optical unit of FIG. 14.

FIG. 17 illustrates a low beam light distribution pattern PL20 during low beam lighting formed by the optical unit 90.

As illustrated in FIG. 17, during low beam lighting, the vehicle headlamp 10 emits the low beam light distribution pattern PL20 by turning on the first light source 91 of the optical unit 90 by the lamp controller 60. The low beam light distribution pattern PL20 is formed by a first light distribution pattern P31 and a second light distribution pattern P32. The first light distribution pattern P31 has a first cutoff line CL30, and covers a region below the first cutoff line CL30. The second light distribution pattern P32 covers a region overlapping the first cutoff line CL30 of the first light distribution pattern P31.

A portion of light emitted from the first light source 91 propagates through the light guide 93 and is concentrated near the rear focal point f of the projection lens 94. A portion of light L11 concentrated near the rear focal point of the projection lens 94 is projected to the front of the headlamp while being inverted vertically and horizontally by the projection lens 94. At this time, since part of light is blocked by the shade 951, the first light distribution pattern P31 having the first cutoff line CL30 is formed. The shape of the first cutoff line CL30 corresponds to the edge of the front end 9511 of the shade 951.

Further, of light concentrated near the rear focal point of the projection lens 94, a portion of light L12 concentrated in front of the shade 951 is reflected by the reflective surface 9521 of the reflective portion 952. Thus, the second light distribution pattern P32 overlapping the first cutoff line CL30 is formed.

In this example, since the reflective portion 952 is provided at the right side of the lateral center of the projection lens 94 and is shorter than the length of a right portion of the shade 951, the second light distribution pattern P32 is formed to overlap a portion of a second portion CL32 of the first cutoff line CL30 at the left side (the opposite lane side) of the V-V line.

This enables a first portion CL31 of the first cutoff line CL30 (at the host vehicle lane side of the V-V line) to appear sharp, and the second portion CL32 (at the opposite lane side of the V-V line) to appear blurred.

Figure 18:
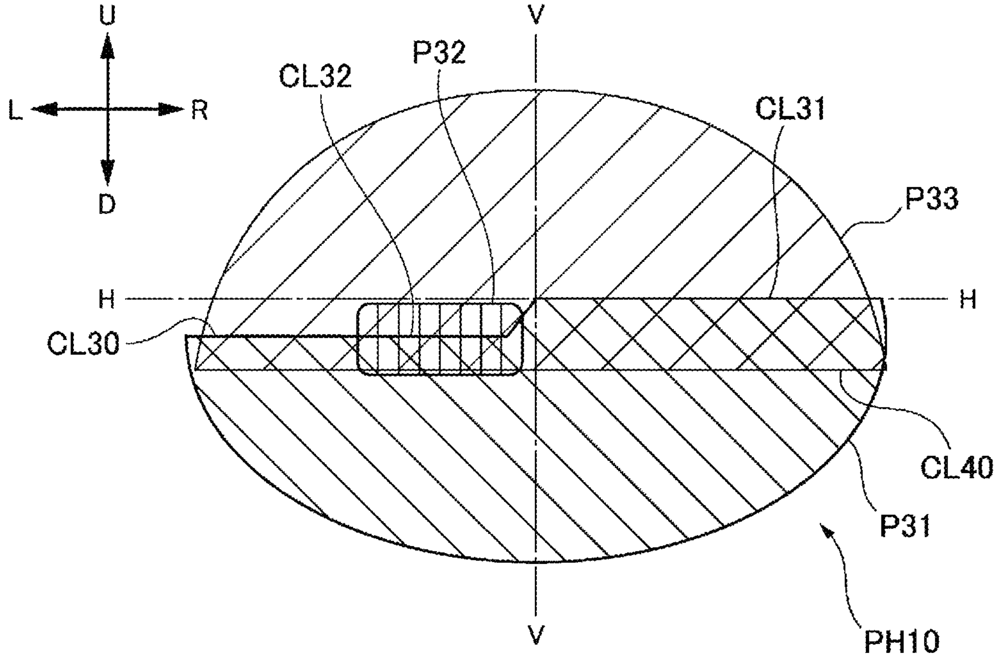
FIG. 18 is a diagram illustrating a high beam light distribution pattern during high beam lighting formed by the optical unit of FIG. 14.

In the meantime, during high beam lighting, the vehicle headlamp 10 emits a high beam light distribution pattern PH10 by turning on the second light source 92 in addition to the first light source 91 of the optical unit 90. That is, as illustrated in FIG. 18, the high beam light distribution pattern PH10 is formed not only by the first and second light distribution patterns P31 and P32, which are made by light emitted from the first light source 91, but also by a third light distribution pattern P33, which is made by light emitted from the second light source 92.

A portion of light emitted from the second light source 92 propagates through the light guide 93 and is concentrated near the rear focal point f of the projection lens 94. A portion of light L13, concentrated near the rear focal point f of the projection lens 94, is projected to the front of the headlamp while being inverted vertically and horizontally by the projection lens 94. At this time, since a portion of light is blocked by the shade 951, the third light distribution pattern P33 having a second cutoff line CL40 is formed. Further, a portion of light L14, directed toward the lower surface of the shade 951, of light concentrated near the rear focal point f of the projection lens 94, is reflected by the lower surface 9521 of the shade 951.

With this configuration, it is possible to reduce the number of components constituting the vehicle headlamp 10 since both the functions of the first optical unit 70 and the second optical unit 80 may be realized by the single optical unit 90.

Although the reflective portion 952 is provided at the right side of the lateral center of the projection lens 94 in this example, the reflective portion 952 may be provided at the left side of the lateral center of the projection lens 94. Further, although the reflective portion 952 is formed shorter than the shade 951, it may also be configured to have the same length as the shade 951.

Further, in this example, light from the first and second light sources 91 and 92 is emitted toward the projection lens 94 through the light guide 93. However, a reflector may be used instead of the light guide 93. For example, the first light source 91 as well as a first reflector that substantially converges light from the first light source 91 to the vicinity of the rear focal point of the projection lens 94 may be disposed on the upper surface of a support member arranged between the first light source 91 and the second light source 92, and the second light source 92 as well as a second reflector that substantially converges light from the second light source 92 to the vicinity of the rear focal point of the projection lens 94 may be disposed on the lower surface of the support member.

(Second Optical Unit 180 According to Third Embodiment)

Next, a second optical unit 180 according to a third embodiment will be described with reference to FIGS. 19 to 23.

Figure 19:
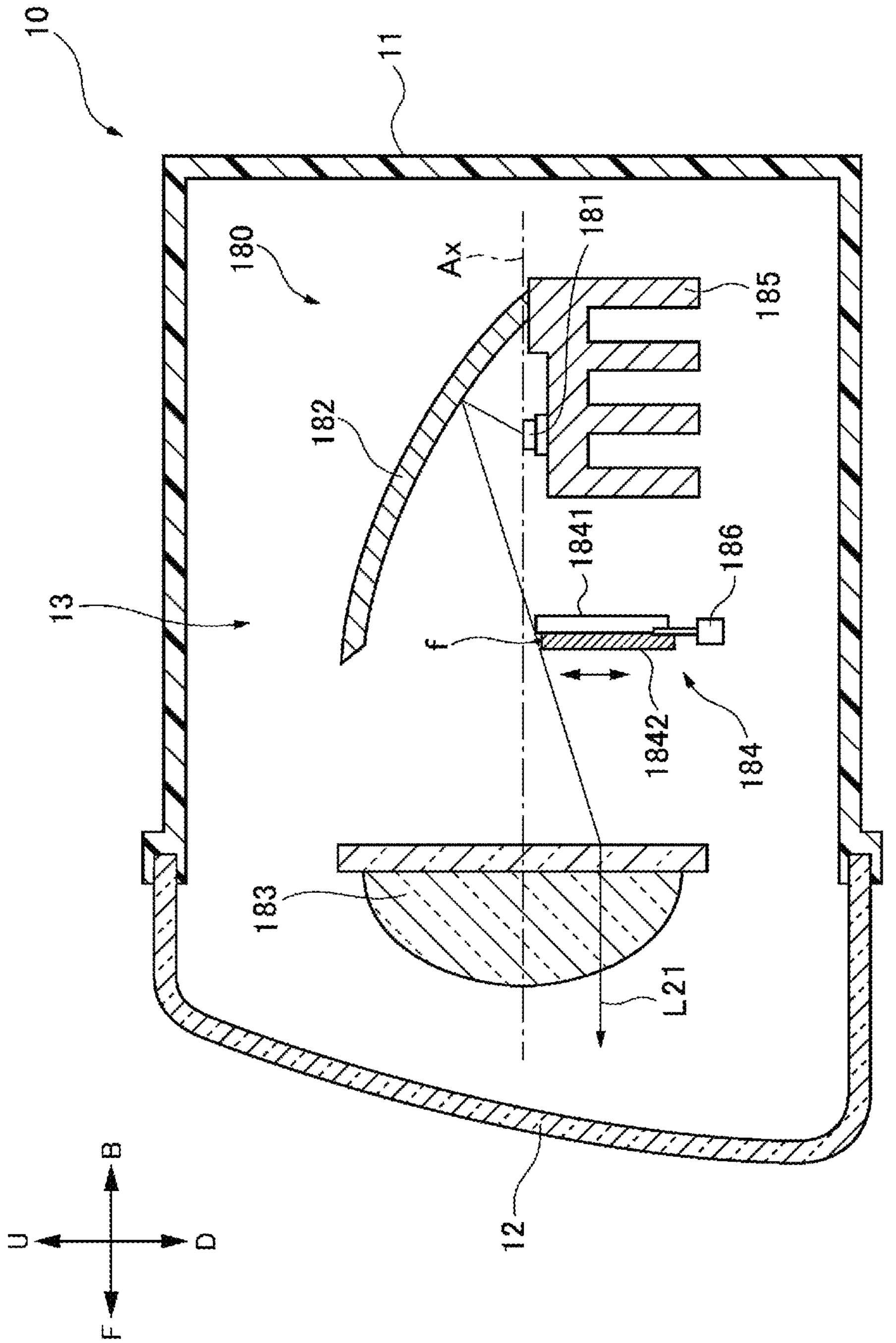
FIG. 19 is a longitudinal sectional view illustrating the configuration of a second optical unit according to a third embodiment.

FIG. 19 is a longitudinal sectional view illustrating the configuration of the second optical unit 180 according to the third embodiment. As illustrated in FIG. 19, the second optical unit 180 includes a light source 181, a reflector 182, a projection lens 183, and a shade 184.

The light source 181 is arranged behind the rear focal point f of the projection lens 183. The light source 181 is, for example, an LED. The light source 181 is disposed on the upper surface of a support member 185 via a circuit board (not illustrated) in a posture in which a light emitting surface thereof faces upward. In addition to an LED, an LD element or an EL element may also be used for the light source 181. The support member 185 is a metallic member, and is, for example, integrally formed with a heat sink.

The reflector 182 is provided on the upper surface of the support member 185, behind the light source 181. A substantially ellipsoidal reflective surface is formed on the inner peripheral surface of the reflector 182. The light source 181 is positioned near a first focal point of the inner peripheral ellipsoidal surface of the reflector 182. Light from the light source 181 is reflected forward by the reflective surface of the reflector 182 to the vicinity of the optical axis Ax extending in the vehicle front-back direction, and is substantially converged at a second focal point of the inner peripheral ellipsoidal surface of the reflector 182 in the vertical cross section including the optical axis Ax.

The expression "near the focal point" as used herein refers not only to the position at which the focal point exists but also includes positions around the focal point.

The projection lens 183 is arranged on the optical axis Ax. The projection lens 183 is configured to project light, emitted from the light source 181 and reflected by the reflector 182, to a region in front of the vehicle 1. The projection lens 183 is positioned such that the rear focal point f thereof is located at the second focal point of the ellipsoidal surface of the inner peripheral edge of the reflector 182. The projection lens 183 forwardly projects an inverted image on the focal plane including the rear focal point f. The projection lens 183 is, for example, an aspherical lens having a convex front surface and a flat back surface. The projection lens 183 is made of a light transmitting material, for example, a transparent resin such as acryl. The projection lens 183 is attached to a lens holder (not illustrated).

The shade 184 is positioned near the rear focal point f of the projection lens 183. The shade 184 is supported by a support member (not illustrated). The shade 184 blocks a portion of light emitted from the light source 181 and reflected by the reflector 182 to form the cutoff line of a light distribution pattern. The shade 184 is shaped such that the front end thereof is curved along the rear focal plane of the projection lens 183.

Figure 20:
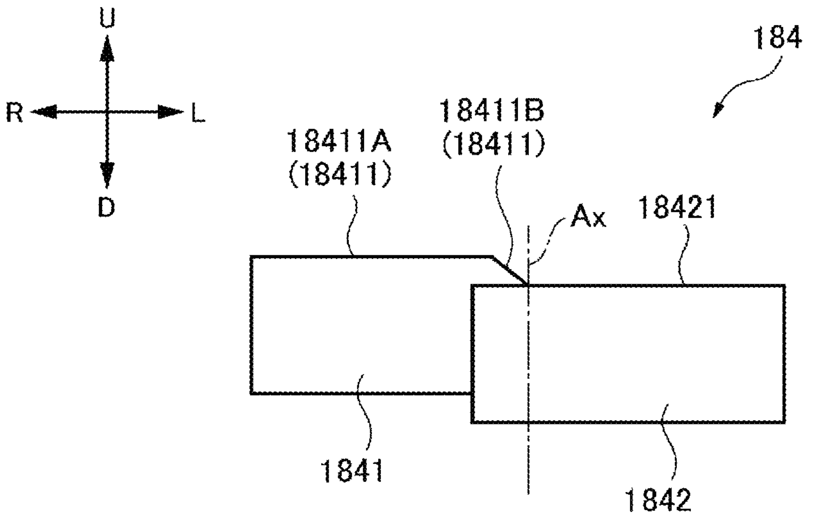
FIG. 20 is a diagram of a shade at a first position as viewed from the projection lens side.
Figure 21:
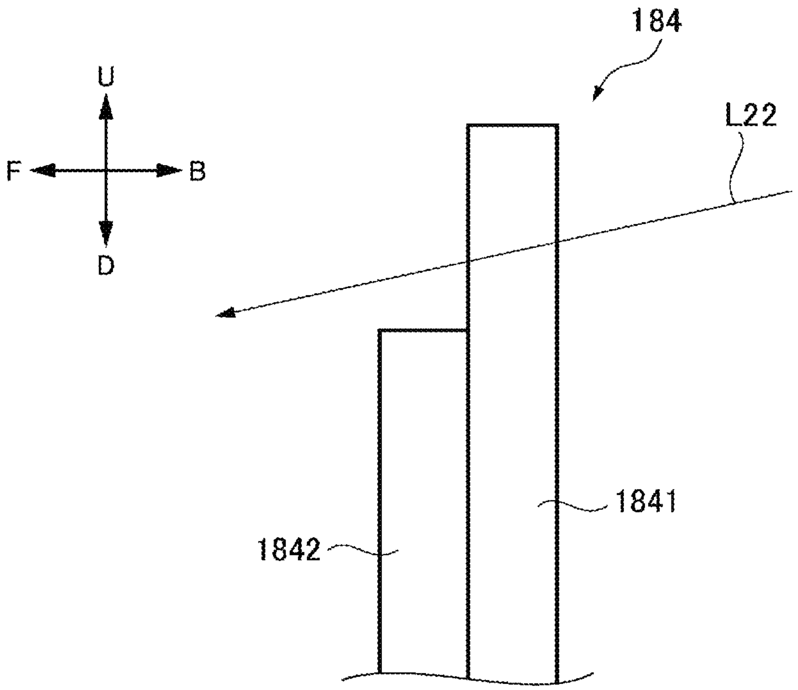
FIG. 21 is a side view of the shade at the first position.

FIG. 20 is a diagram of the shade 184 as viewed from the projection lens 183 side, and FIG. 21 is a side view of a portion of the shade 184. As illustrated in FIG. 20, the shade 184 extends in the left-right direction and is divided into two. Specifically, the shade 184 includes a first shade part 1841 and a second shade part 1842. The first shade part 1841 and the second shade part 1842 are arranged such that part of them overlap each other in a front view of the projection lens 183. In this example, as illustrated in FIG. 21, the second shade part 1842 is arranged closer to the projection lens 183 (at the front side in FIG. 21) than the first shade part 1841.

As illustrated in FIG. 20, an upper edge 18411 of the first shade part 1841 includes a portion 18411A extending in the left-right direction and a portion 18411B extending obliquely downward. An upper edge 18421 of the second shade part 1842 extends in the left-right direction.

The first shade part 1841 is fixed. The second shade part 1842 is configured to be movable up and down relative to the first shade part 1841. In this example, the second shade part 1842 is configured to be movable up and down between a first position and a second position by a drive mechanism 186. The first shade part 1841 is an example of a fixed part. The second shade part 1842 is an example of a movable part.

For example, as illustrated in FIGS. 20 and 21, the second shade part 1842 is located below the first shade part 1841 at the first position. At this time, the upper edge of the shade 184 is formed by the portions 18411A and 18411B of the upper edge 18411 of the first shade part 1841 and the upper edge 18421 of the second shade part 1842.

Figure 22:
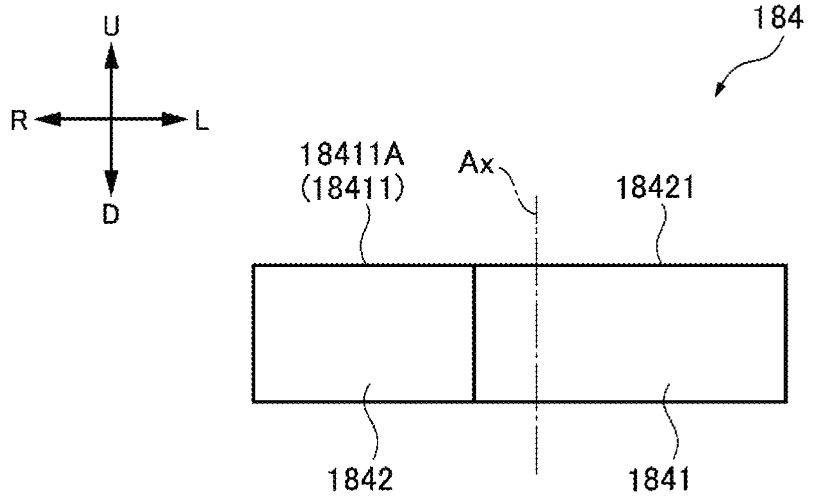
FIG. 22 is a diagram of the shade at a second position as viewed from the projection lens side.
Figure 23:
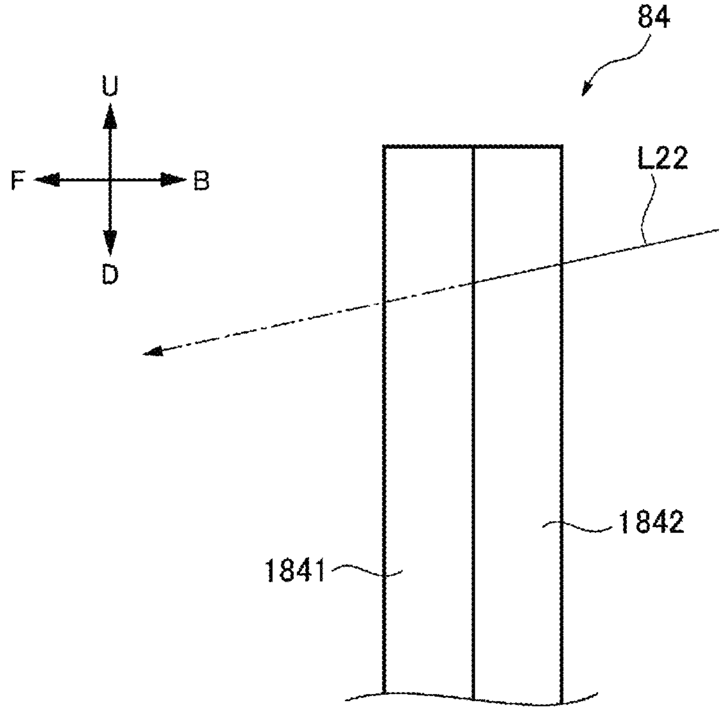
FIG. 23 is a side view of the shade at the second position.

Further, as illustrated in FIGS. 22 and 23, the second shade part 1842 is located at the same height as the first shade part 1841 at the second position. At this time, the upper edge of the shade 184 is formed by the portion 18411A of the upper edge 18411 of the first shade part 1841 and the upper edge 18421 of the second shade part 1842.

The expression "the first shade part 1841 and the second shade part 1842 are located at the same height" as used herein means that a cutoff line portion corresponding to the first shade part 1841 and a cutoff line portion corresponding to the second shade part 1842 are located at the same height. That is, this expression may include a case where the heights of the first and second shade parts 1841 and 1842 differ slightly due to the thicknesses or upper end shapes of the first and second shade parts 1841 and 1842.

Figure 24:
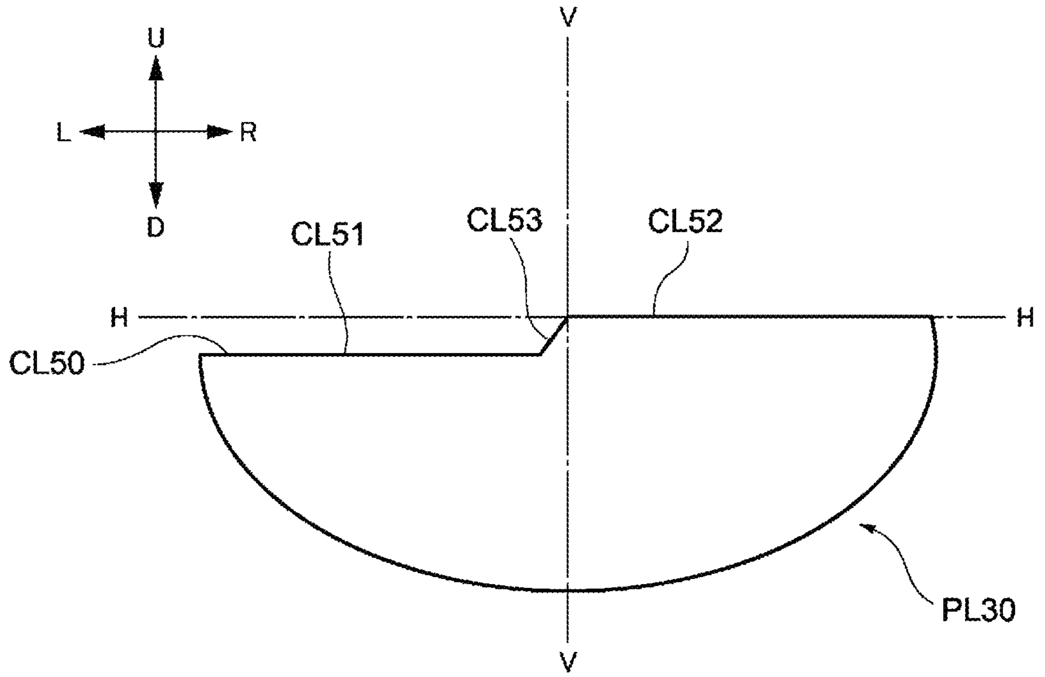
FIG. 24 is a diagram illustrating a low beam light distribution pattern formed when the shade is at the first position.
Figure 25:
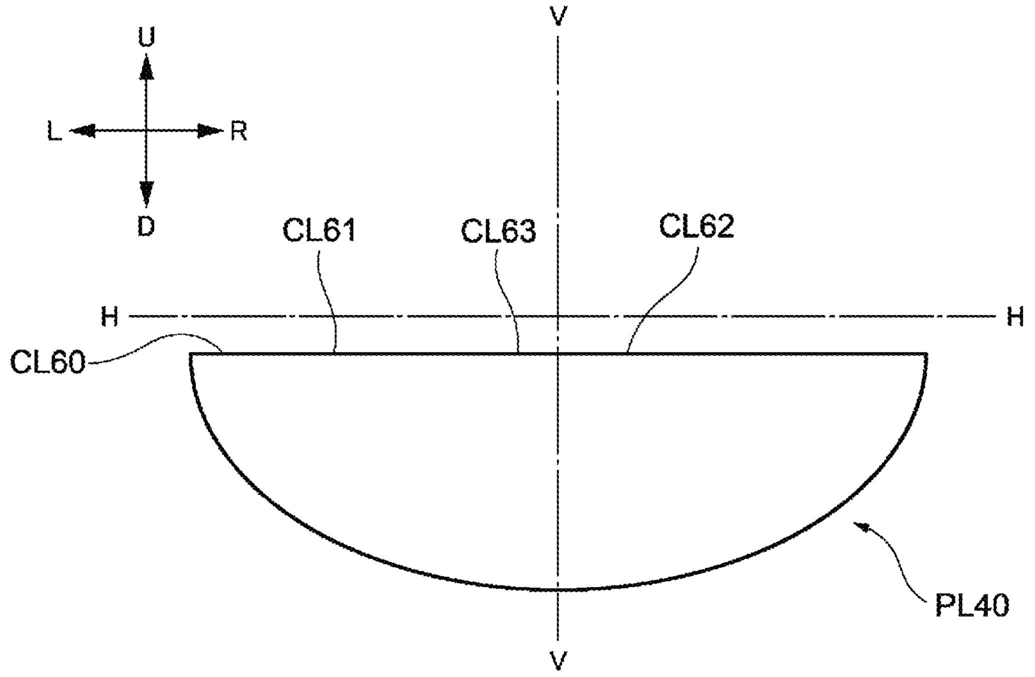
FIG. 25 is a diagram illustrating a low beam light distribution pattern formed when the shade is at the second position.

Hereinafter, low beam light distribution patterns PL30 and PL40 emitted from the vehicle headlamp 10 during low beam lighting will be described with reference to FIGS. 24 and 25. The term "during low beam lighting" refers to a situation in which the driver of the vehicle 1 operates the light switch 40 to emit the low beam light distribution patterns PL30 and PL40. FIG. 24 illustrates the low beam light distribution pattern PL30 when the second shade part 1842 is located at the first position illustrated in FIG. 20. FIG. 25 illustrates the low beam light distribution pattern PL40 when the second shade part 1842 is located at the second position illustrated in FIG. 22. In the present embodiment, a case where the vehicle 1 is traveling in the right lane will be described.

FIGS. 24 and 25 illustrate the low beam light distribution patterns PL30 and PL40 as projected onto a virtual vertical screen at a predetermined position in front of the vehicle 1 (e.g., position 25 meters ahead of the vehicle 1). Further, FIGS. 24 and 25 also illustrate a V-line indicating the vertical direction (up-down direction in FIGS. 24 and 25) at the irradiation range center of the vehicle headlamp 10, and an H-line extending in the horizontal direction (left-right direction in FIGS. 24 and 25) orthogonal to the V-line.

As illustrated in FIGS. 24 and 25, during low beam lighting, the vehicle headlamp 10 emits the low beam light distribution patterns PL30 and PL40 by turning on the second optical unit 180. The low beam light distribution patterns PL30 and PL40 cover a region below cutoff lines CL50 and CL60 located on or below the H-line.

As illustrated in FIG. 19, a portion of light emitted from the light source 181 is reflected by the reflector 182 and is concentrated near the shade 184. A portion of light L21 concentrated near the shade 184 is projected to the front of the headlamp while being inverted vertically and horizontally by the projection lens 183. At this time, since a portion of light is blocked by the shade 184, the low beam light distribution patterns PL30 and PL40 having the cutoff lines CL50 and CL60 at the upper edges thereof are formed. The shape of these cutoff lines CL50 and CL60 correspond to the upper edge of the shade 184.

For example, when the second shade part 1842 is located at the first position illustrated in FIG. 20, the cutoff line CL50 of the low beam light distribution pattern PL30 includes a first cutoff line portion CL51, a second cutoff line portion CL52, and a third cutoff line portion CL53. The shape of the first cutoff line portion CL51 corresponds to the portion 18411A of the upper edge 18411 of the first shade part 1841. That is, the first cutoff line portion CL51 is located at the left side of the V-line and extends in the left-right direction. The shape of the second cutoff line portion CL52 corresponds to the upper edge 18421 of the second shade part 1842. That is, the second cutoff line portion CL52 is located at the right side of the V-line and extends in the left-right direction. The shape of the third cutoff line portion CL53 corresponds to the portion 18411B of the upper edge 18411 of the first shade part 1841. That is, the third cutoff line portion CL53 is located at the left side of the V-line and extends obliquely. The low beam light distribution pattern PL30 is an example of a first light distribution pattern. The first cutoff line portion CL51 is an example of a second portion. The second cutoff line portion CL52 is an example of a first portion.

In the meantime, when the second shade part 1842 is located at the second position illustrated in FIG. 22, the cutoff line CL60 of the low beam light distribution pattern PL40 includes a first cutoff line portion CL61, a second cutoff line portion CL62, and a third cutoff line portion CL63. The shape of the first cutoff line portion CL61 corresponds to the portion 18411A of the upper edge 18411 of the first shade part 1841. That is, the first cutoff line portion CL61 is located at the left side of the V-line and extends in the left-right direction. The shape of the second cutoff line portion CL62 corresponds to the upper edge 18421 of the second shade part 1842. That is, the second cutoff line portion CL62 is located at the right side of the V-line and extends in the left-right direction. The shape of the third cutoff line portion CL63 corresponds to the upper edge 18421 of the second shade part 1842. That is, the third cutoff line portion CL63 is located at the left side of the V-line and extends in the left-right direction. The low beam light distribution pattern PL40 is an example of a second light distribution pattern.

In other words, the second shade part 1842 moves up and down between the first position and the second position, so that light L22 that was not shielded by the second shade part 1842 at the first position is shielded by the second shade part 1842 at the second position, or the light L22 that was shielded by the second shade part 1842 at the second position is not shielded by the second shade part 1842 at the first position, as illustrated in FIGS. 21 and 23. Thus, the second cutoff line portion of the cutoff line of the low beam light distribution pattern varies in the up-down direction, and the low beam light distribution patterns PL30 and PL40 having different heights of the second cutoff line portions are formed.

Figure 26:
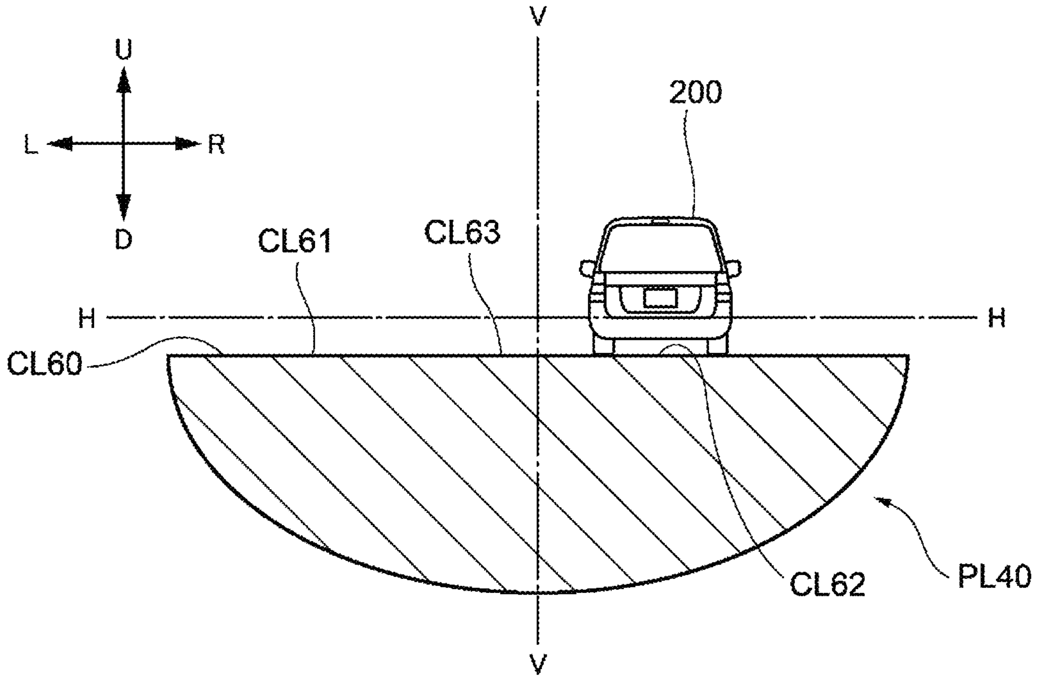
FIG. 26 is a diagram illustrating a low beam light distribution pattern formed when there is a preceding vehicle ahead.

The movement in the up-down direction of the second shade part 1842 may be controlled, for example, depending on the presence of a preceding vehicle or an oncoming vehicle in front of the vehicle 1 during low beam lighting. For example, FIG. 26 illustrates a low beam light distribution pattern formed when there is a preceding vehicle 200 on the host vehicle lane side in front of vehicle 1 during low beam lighting. As illustrated in FIG. 26, when there is the preceding vehicle 200 on the host vehicle lane side in front of the vehicle 1 during low beam lighting, the camera 30 outputs imaging data regarding the preceding vehicle 200 to the vehicle controller 50. The vehicle controller 50 detects surrounding environment information, including position information on the preceding vehicle 200, from the imaging data output from the camera 30, and transmits the surrounding environment information to the lamp controller 60. For example, when the second shade part 1842 is at the first position illustrated in FIG. 20, the lamp controller 60 controls the second optical unit 180 such that the second shade part 1842 moves to the second position illustrated in FIG. 21, based on the surrounding environment information received from the vehicle controller 50. By this control, the low beam light distribution pattern formed by the second optical unit 180 becomes the low beam light distribution pattern PL40 having the downwardly moved second cutoff line portion CL62.

Subsequently, when the lamp controller 60 determines that there is no preceding vehicle 200 on the host vehicle lane side in front of the vehicle 1 based on the surrounding environment information received from the vehicle controller 50, it controls the second optical unit 180 such that the second shade part 1842 moves from the second position to the first position. By this control, the low beam light distribution pattern formed by the second optical unit 180 becomes the low beam light distribution pattern PL30 having the upwardly moved second cutoff line portion CL52 illustrated in FIG. 24.

Figure 27:
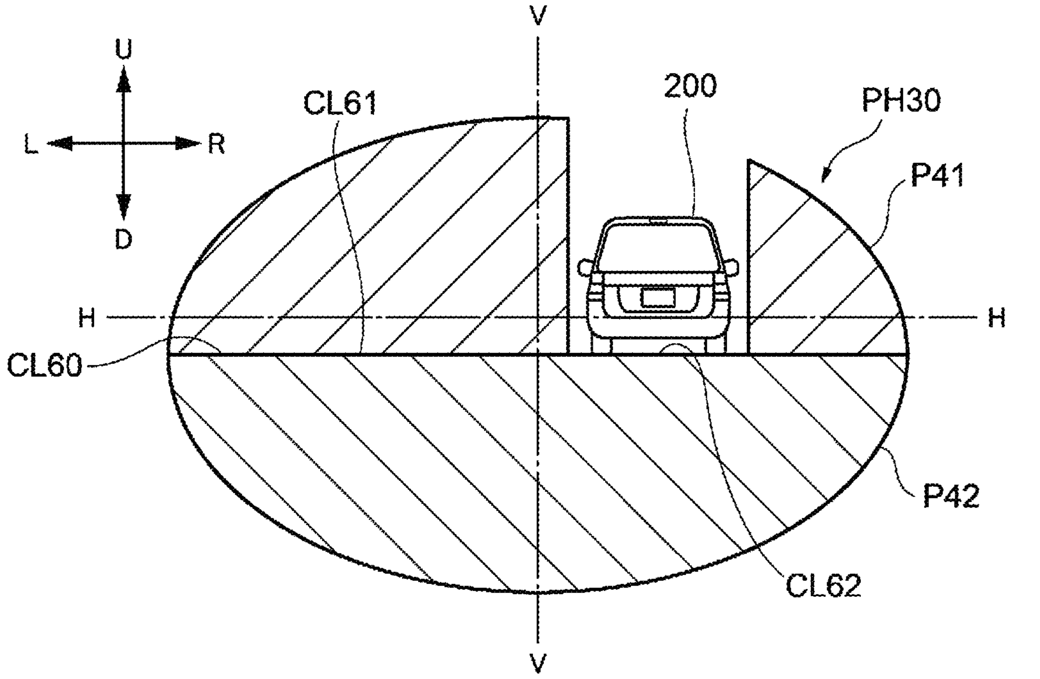
FIG. 27 is a diagram illustrating an ADB light distribution pattern formed when there is a preceding vehicle ahead.

FIG. 27 illustrates a high beam light distribution pattern PH30 emitted from the vehicle headlamp 10 during high beam lighting. The term "during high beam lighting" refers to a situation in which the driver of the vehicle 1 operates the light switch 40 to emit the high beam light distribution pattern PH30. During high beam lighting, the vehicle headlamp 10 emits the high beam light distribution pattern 30, which is formed by an upper light distribution pattern P41 and a lower light distribution pattern P42, by turning on the first optical unit 70 and the third optical unit 180. The upper light distribution pattern P41 is a light distribution pattern formed by the first optical unit 70. The lower light distribution pattern P42 is a light distribution pattern formed by the second optical unit 180 and has the same shape as the low beam light distribution pattern. In this example, the high beam light distribution pattern PH30 is an ADB light distribution pattern.

For example, as illustrated in FIG. 27, when there is the preceding vehicle 200 on the host vehicle lane side in front of the vehicle 1 during high beam lighting, the lamp controller 60 controls the first optical unit 70 such that light is not emitted toward the preceding vehicle 200 based on surrounding environment information received from the vehicle controller 50. By this control, the upper light distribution pattern P41 irradiates a region above the H-line but shades the surrounding region of the preceding vehicle 200. Further, the lamp controller 60 controls the second optical unit 180 such that the second shade part 1842 is located at the second position illustrated in FIG. 21. By this control, the lower light distribution pattern P42 formed by the second optical unit 180 becomes a light distribution pattern having the cutoff line CL60 in which the second cutoff line portion CL62 is located at the same height as the first cutoff line portion CL61. The second optical unit 180 is controlled such that the second shade part 1842 is switched between the first position and the second position depending on the presence of a preceding vehicle or an oncoming vehicle in front of the vehicle 1, but the second shade part 1842 may be controlled so as to be constantly located at the second position during high beam lighting.

In this way, according to the vehicle headlamp 10 of the present embodiment, it is possible to prevent glare to the driver of the preceding vehicle 200 since when there is the preceding vehicle 200 on the host vehicle lane side in front of the the vehicle 1 during low beam lighting and high beam lighting, the height of the second cutoff line portion CL62, located below the preceding vehicle 200, of the cutoff line CL60 is low. In the meantime, it is possible to ensure good visibility for the driver of the vehicle 1 since when there is no preceding vehicle 200, the height of the second cutoff line portion CL52 of the cutoff line CL50 is high.

In the present embodiment, the second shade part 1842 is located in front of the first shade part 1841. However, the first shade part 1841 may be located in front of the second shade part 1842.

(Second Optical Unit 280 According to Modification)

In the third embodiment, the second shade part 1842 is configured to be movable up and down between the first position and the second position. However, for example, the second shade part 1842 may be configured to be rotatable, thereby being movable up and down relative to the first shade part 1841.

Figure 28:
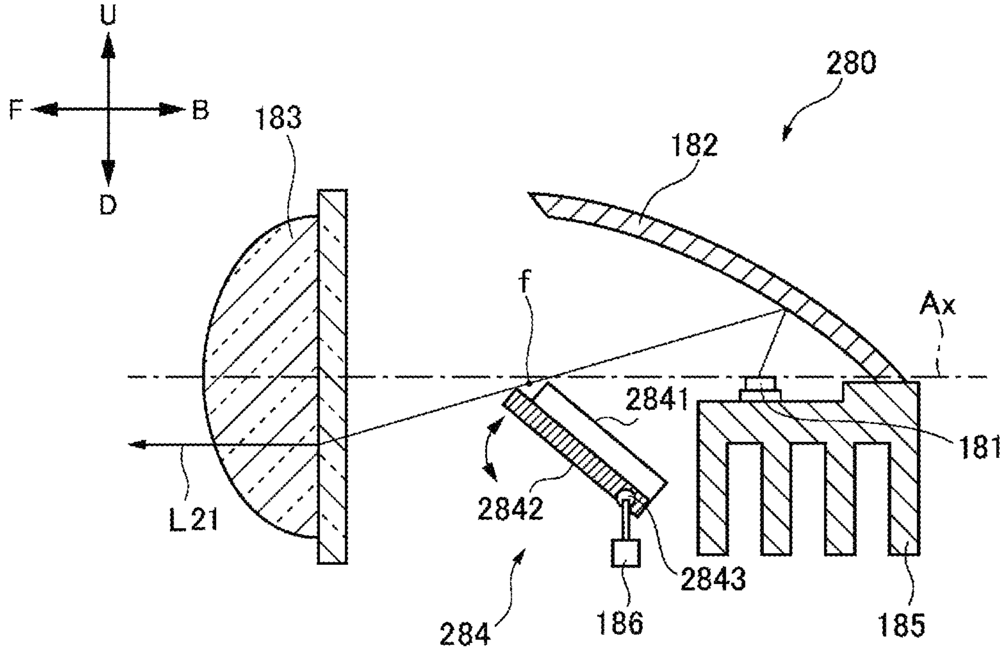
FIG. 28 is a longitudinal sectional view illustrating the configuration of a second optical unit according to a modification.

For example, FIG. 28 illustrates the configuration of a second optical unit 280 according to a modification. The second optical unit 280 according to the modification differs from the second optical unit 180 illustrated in FIG. 19 in that a shade 284 is configured to be rotatable. In this modification, the same parts as those in the above embodiments are described using the same reference numerals, and descriptions of overlapping parts are omitted as appropriate.

The shade 284 is positioned near the rear focal point f of the projection lens 183. The shade 284 is supported by a support member (not illustrated). The shade 284 blocks a portion of light emitted from the light source 181 and reflected by the reflector 182, thereby forming the cutoff line of a light distribution pattern. The shade 284 is shaped such that the front end thereof is curved along the rear focal plane of the projection lens 183.

Figure 29:
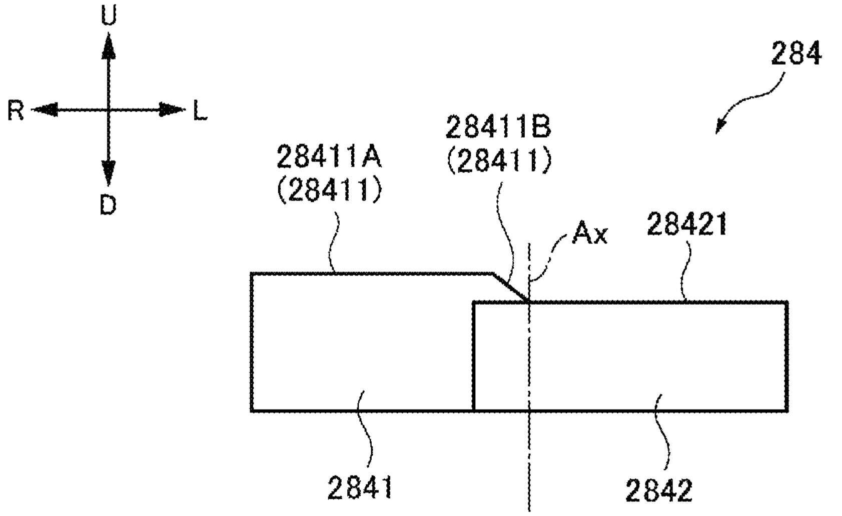
FIG. 29 is a diagram of the shade at a third position as viewed from the projection lens side.
Figure 30:
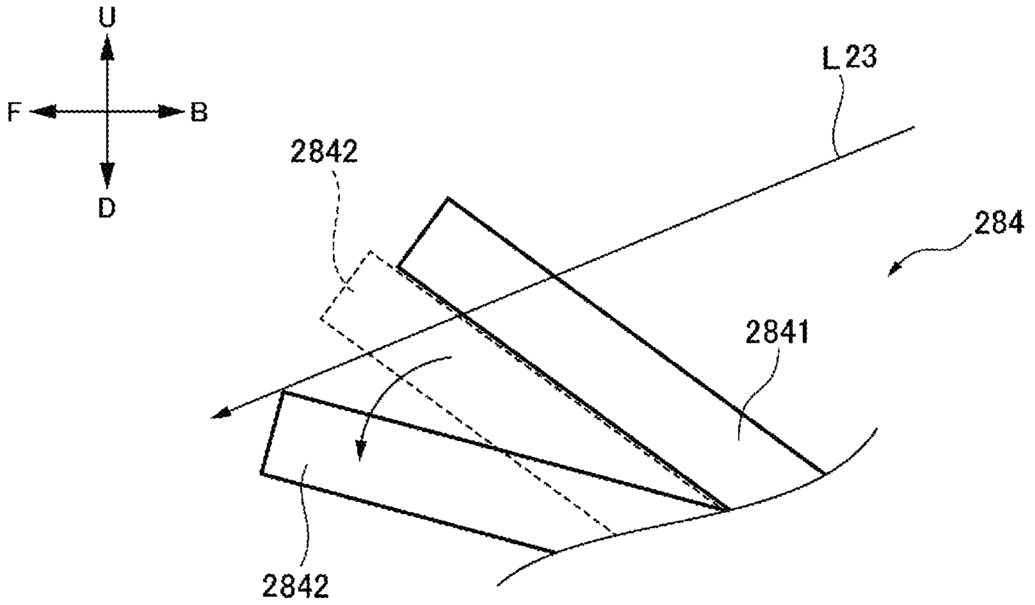
FIG. 30 is a side view of the shade at the third position.

FIG. 29 is a diagram of the shade 284 as seen from the projection lens 183 side, and FIG. 30 is a side view of a portion of the shade 284. As illustrated in FIG. 29, the shade 284 extends in the left-right direction and is divided into two. Specifically, the shade 284 includes a first shade part 2841 and a second shade part 2842. The first shade part 2841 and the second shade part 2842 are arranged such that part of them overlap each other in a front view of the projection lens 183. In this example, as illustrated in FIG. 30, the second shade part 2842 is arranged closer to the projection lens 183 (at the front side in FIG. 30) than the first shade part 2841.

As illustrated in FIG. 29, an upper edge 28411 of the first shade part 2841 includes a portion 28411A extending in the left-right direction and a portion 28411B extending obliquely downward. An upper edge 28421 of the second shade part 2842 extends in the left-right direction.

The first shade part 2841 is fixed. The second shade part 2842 is configured to be movable up and down relative to the first shade part 2841. In this example, as illustrated in FIG. 28, the shade 284 has a rotation shaft 2843. The second shade part 2842 is configured to be rotatable about the rotation shaft 2843 as a pivot between a third position and a fourth position by the drive mechanism 186. The first shade part 2841 is an example of a fixed part. The second shade part 2842 is an example of a movable part.

For example, as illustrated in FIG. 30, at the third position, the second shade part 2842 is arranged in an inclined state from a position parallel to the first shade part 2841 toward the projection lens 183. That is, as illustrated in FIG. 29, the second shade part 2842 is located below the first shade part 2841 at the third position. At this time, the upper edge of the shade 284 is formed by the portions 28411A and 28411B of the upper edge 28411 of the first shade part 2841 and the upper edge 28421 of the second shade part 2842. The low beam light distribution pattern formed when the second shade part 2842 is located at the third position corresponds to the low beam light distribution pattern PL30 illustrated in FIG. 24.

Figure 31:
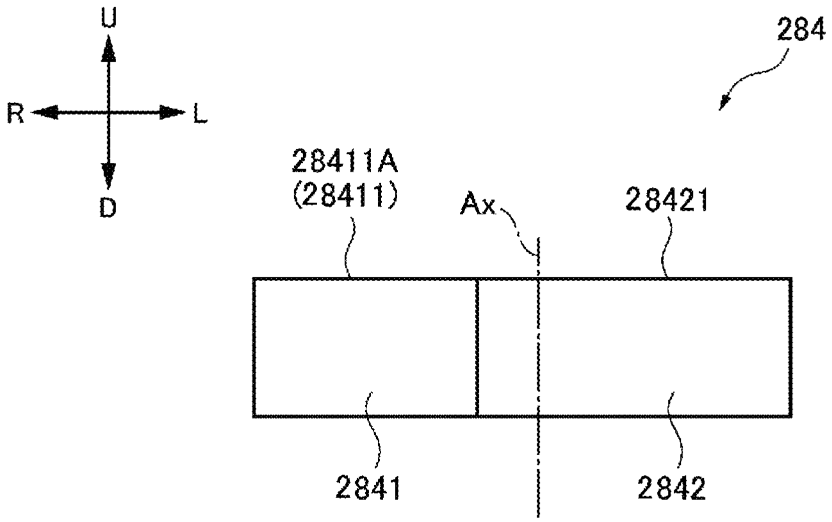
FIG. 31 is a diagram of a shade at a fourth position as viewed from the projection lens side.
Figure 32:
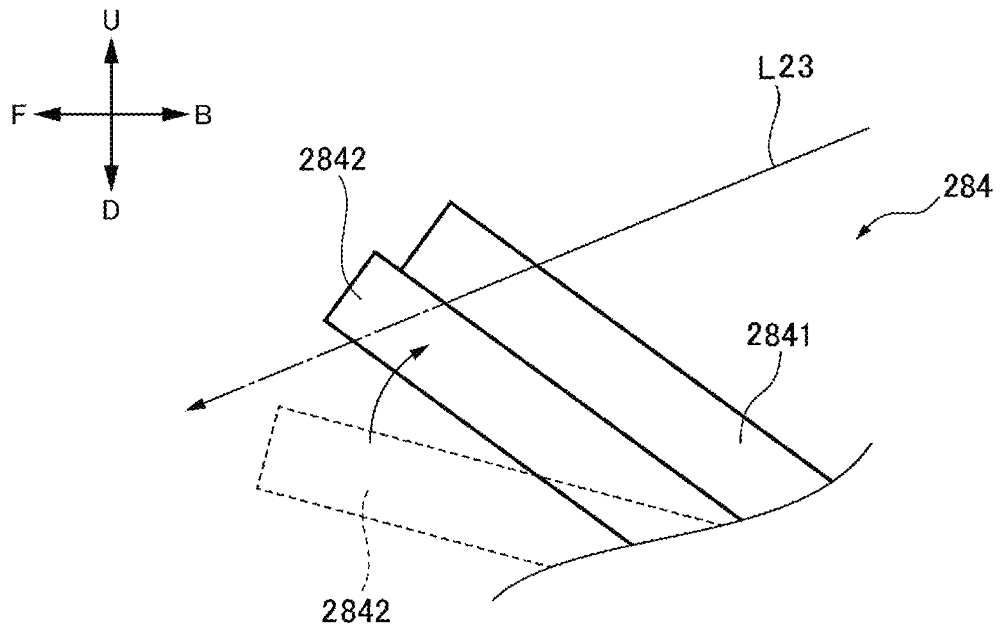
FIG. 32 is a side view of the shade at the fourth position.

Further, as illustrated in FIG. 32, at the fourth position, the second shade part 2842 is arranged so as to be parallel to the first shade part 2841. That is, as illustrated in FIG. 31, at the fourth position, the second shade part 2842 is located at the same height as the first shade part 2841. At this time, the upper edge of the shade 284 is formed by the portion 28411A of the upper edge 28411 of the first shade part 2841 and the upper edge 28421 of the second shade part 2842. The low beam light distribution pattern formed when the second shade part 2842 is located at the fourth position corresponds to the low beam light distribution pattern PL40 illustrated in FIG. 25.

In other words, the second shade part 2842 rotates between the third position and the fourth position, so that light L23 that was not shielded by the second shade part 2842 at the third position is shielded by the second shade part 2842 at the fourth position, or the light L23 that was shielded by the second shade part 2842 at the fourth position is not shielded by the second shade part 2842 at the third position, as illustrated in FIGS. 30 and 32. Thus, the second cutoff line portion of the cutoff line of the low beam light distribution pattern varies in the up-down direction, and the low beam light distribution patterns PL30 and PL40 having different heights of the second cutoff line portions are formed.

In this way, in the second optical unit 280 according to the modification, it is possible to form a low beam light distribution pattern or a high beam light distribution pattern that prevents the occurrence of glare by varying a portion of the cutoff line up and down when there is a preceding vehicle or an oncoming vehicle in front of the vehicle 1.

In the third embodiment and the modification described above, the first shade parts 1841 and 2841 are fixed, and the second shade parts 1842 and 2842 are configured to be movable up and down relative to the first shade parts 1841 and 2841. However, the second shade parts 1842 and 2842 may be fixed, and the first shade parts 1841 and 2841 may be configured to be movable up and down relative to the second shade parts 1842 and 2842. Alternatively, both the first shade parts 1841 and 2841 and the second shade parts 1842 and 2842 may be configured to be movable up and down, respectively.

Figure 33:
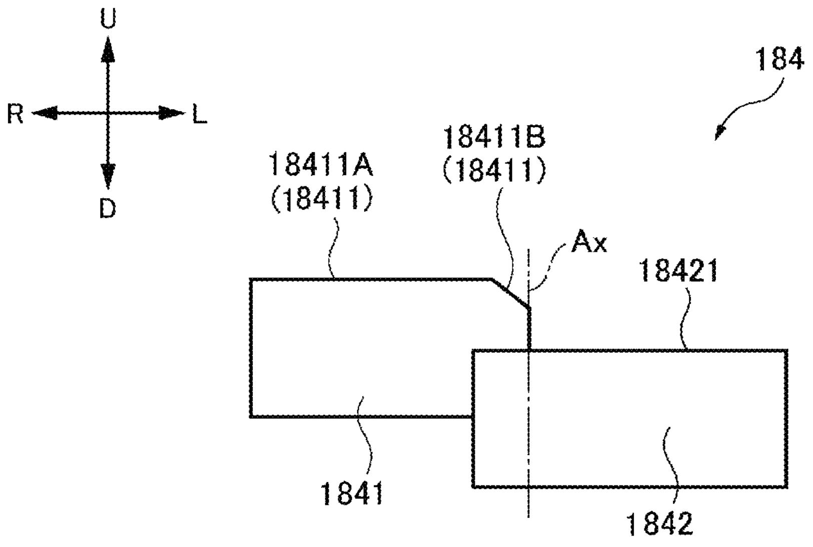
FIG. 33 is a diagram illustrating another configuration of the shade in which a first shade part has moved upward, as viewed from the projection lens side.

For example, FIG. 33 illustrates the shade 184 when the first shade part 1841 has moved upward relative to the second shade part 1842 from the position illustrated in FIG. 20. Further, FIG. 34 illustrates a low beam light distribution pattern PL50 formed when the shade 184 is arranged as illustrated in FIG. 33.

Figure 34:
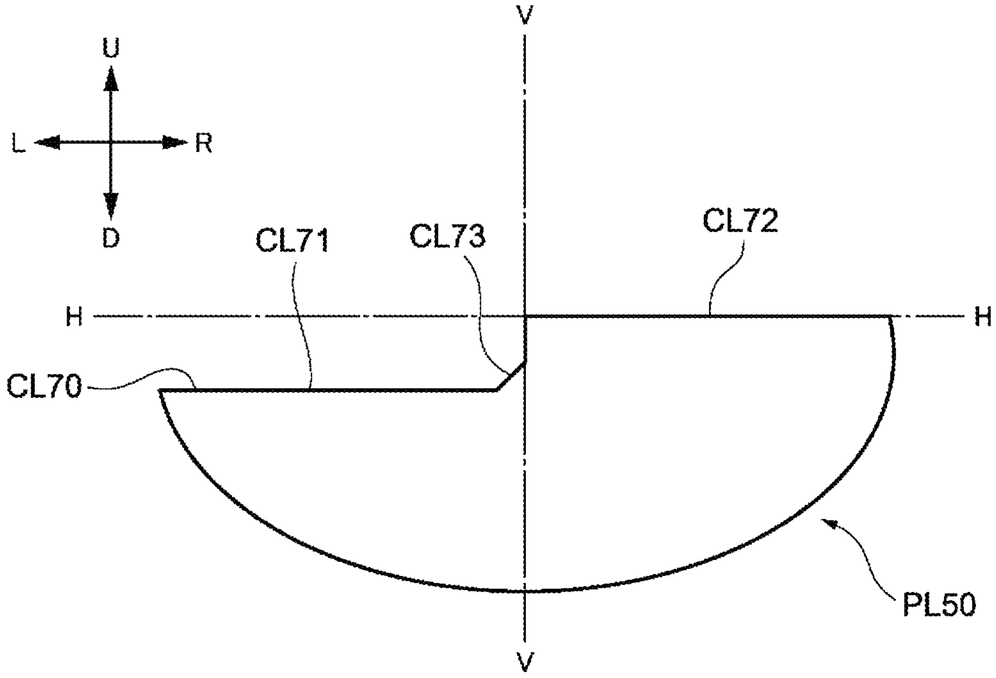
FIG. 34 is a diagram illustrating a low beam light distribution pattern formed when the shade is at the position illustrated in FIG. 33.

As illustrated in FIG. 34, a first cutoff line portion CL71 of a cutoff line CL70 of the low beam light distribution pattern PL50 is located below the first cutoff line portion CL51 of the cutoff line CL50 of the low beam light distribution pattern PL30 illustrated in FIG. 24.

Figure 35:
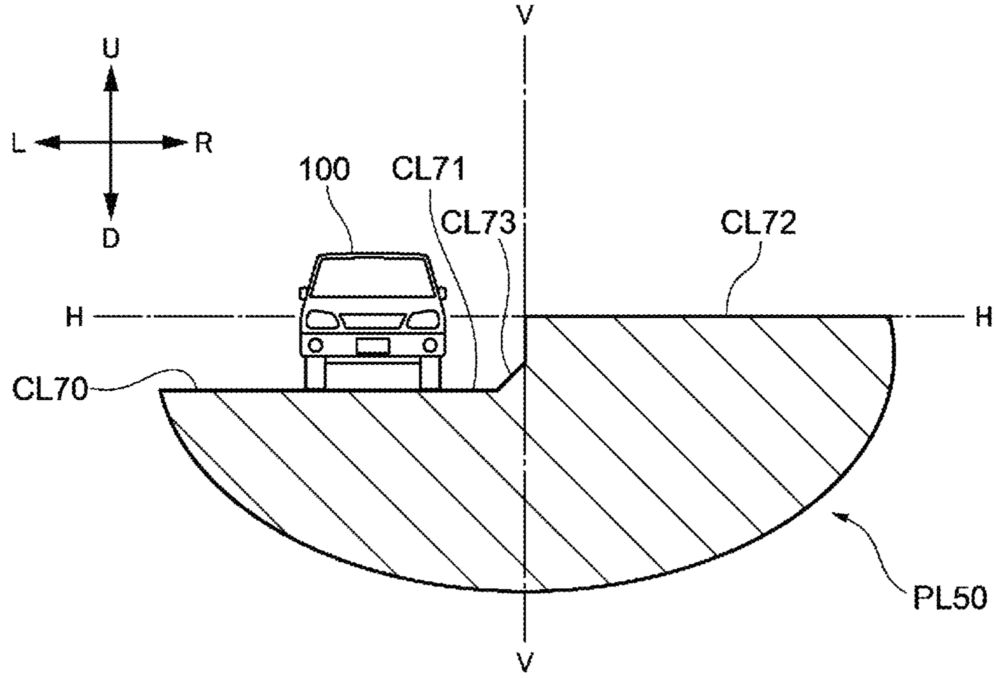
FIG. 35 is a diagram illustrating a low beam light distribution pattern formed when there is an oncoming vehicle ahead.

For example, as illustrated in FIG. 35, when there is the oncoming vehicle 100 at the opposite lane side in front of the vehicle 1 during low beam lighting, the camera 30 outputs imaging data regarding the oncoming vehicle 100 to the vehicle controller 50. The vehicle controller 50 detects surrounding environment information, including position information on the oncoming vehicle 100, from the imaging data output from the camera 30, and transmits the surrounding environment information to the lamp controller 60. The lamp controller 60 controls the second optical unit 180 such that the first shade part 1841 is located at the position illustrated in FIG. 33, based on the surrounding environment information received from the vehicle controller 50. By this control, the low beam light distribution pattern formed by the second optical unit 180 becomes the low beam light distribution pattern PL50 in which the first cutoff line portion CL71 has further moved downward, as illustrated in FIG. 34.

Subsequently, when the lamp controller 60 determines that there is no oncoming vehicle 100 in front of the vehicle 1 based on the surrounding environment information received from the vehicle controller 50, it controls the second optical unit 180 such that the first shade part 1841 is located at the position illustrated in FIG. 20. By this control, the low beam light distribution pattern formed by the second optical unit 180 becomes the low beam light distribution pattern PL30 in which the first cutoff line portion CL51 illustrated in FIG. 24 has moved upward.

In this way, it is possible to prevent glare to the driver of the oncoming vehicle 100 since when there is the oncoming vehicle 100 at the opposite lane side in front of the the vehicle 1 during low beam lighting or high beam lighting, the height of the first cutoff line portion CL71, which is located below the oncoming vehicle 100, of the cutoff line CL70 is low. In the meantime, it is possible to ensure good visibility for the driver of the vehicle 1 since when there is no oncoming vehicle 100, the height of the first cutoff line portion CL51 is high.

The above embodiments have described cases where the vehicle 1 is traveling in the right lane, but the present disclosure may also be applied to cases where the vehicle 1 is traveling in the left lane.

Although the lamp controller 60 is installed to the vehicle headlamp 10 in the above embodiments, the lamp controller 60 may be installed to the vehicle 1 instead of the vehicle headlamp 10. In other words, the lamp controller 60 may be integrated into the vehicle controller 50.

Although the camera 30 is installed to the vehicle 1 in the above embodiments, the camera 30 may be installed to the vehicle headlamp 10 instead of the vehicle 1.

From the foregoing, it will be understood that various examples of the present disclosure are described for illustrative purposes, and that various variations may be made without departing from the scope and idea of the present disclosure. Therefore, the various examples disclosed herein are not intended to limit the essential scope and ideas designated by each of the following claims.

What is claimed is:

1. A vehicle headlamp comprising:

a projection lens;

a light source arranged behind a rear focal point of the projection lens; and an optical element configured to control light emitted from the light source, wherein the optical element includes:

a shade located near the rear focal point of the projection lens and configured to shield a portion of the light emitted from the light source to form a cutoff line of a light distribution pattern;

a reflective portion extending from the shade toward the projection lens and configured to reflect a portion of the light emitted from the light source toward the projection lens to irradiate a region overlapping the cutoff line with the light, the shade includes a corner formed by an upper surface extending along an optical axis direction and a front end surface orthogonal thereto, a reflective surface of the reflective portion extends obliquely downward from an edge of the corner toward the projection lens, and the reflective portion is curved along a rear focal plane of the projection lens in a plan view.

2. The vehicle headlamp according to claim 1, wherein the reflective portion is provided at a right or left side of an optical axis which is a lateral center of the projection lens in a front view of the projection lens.

3. The vehicle headlamp according to claim 1, wherein the cutoff line of the light distribution pattern is blurred by the light reflected by the reflective portion.

4. The vehicle headlamp according to claim 1, wherein the reflective surface of the reflective portion is disposed at a position offset from a rear focal point of the projection lens to form the blurred image.

5. The vehicle headlamp according to claim 1, wherein the edge of the corner of the shade is curved along the rear focal plane of the projection lens, and wherein the reflective portion is curved along the edge of the shade.

6. The vehicle headlamp according to claim 1, wherein the reflective portion is configured to be movable up and down.

7. A vehicle headlamp comprising a projection lens having a rear focal plane and a shade configured to form a light distribution pattern that irradiates a region below a cutoff line located on or below an H-line with light by blocking at least a portion of light from a light source to be projected through the projection lens, wherein the shade includes a fixed part and a movable part, the cutoff line is formed by the fixed part and the movable part, and the shade is configured to vary a blurriness of a portion of the cutoff line in an up-down direction by moving the movable part relative to the fixed part.

8. The vehicle headlamp according to claim 7, wherein the cutoff line includes a first portion located at one lateral side of a V-line and a second portion located at a remaining lateral side, and wherein the movable part is configured to vary the blurriness of the first portion.

9. The vehicle headlamp according to claim 8, wherein the shade is capable of forming, by the movable part, a first light distribution pattern in which the first portion is located above the second portion, a second light distribution pattern in which the first portion and the second portion are located at an equal height, and the first portion in the first light distribution pattern is formed to be more blurred than the second portion.

10. The vehicle headlamp according to claim 8, wherein the second portion is formed by the fixed part of the shade.

11. The vehicle headlamp according to claim 10, wherein the movable part and the fixed part of the shade are divided in a left-right direction, and wherein the movable part is configured to be movable up and down relative to the fixed part to vary a distance between the movable part and the rear focal point of the projection lens.

12. The vehicle headlamp according to claim 7, further comprising:

a first optical unit configured to irradiate at least a region above the H-line with a light pattern in which a region where an object is present is dimmed; and a second optical unit configured to irradiate a region on or below the H-line with a light distribution pattern, wherein the shade is included in the second optical unit.

13. The vehicle headlamp according to claim 1, wherein the reflective surface of the reflective portion is disposed at a position offset forwardly closer to the projection lens than the rear focal point of the projection lens, so as to form a blurred image by intentional optical aberration in a region overlapping the cutoff line.

14. The vehicle headlamp according to claim 1, wherein the reflective portion is formed integrally with the shade or formed separately and connected to the shade, and the reflective surface of the reflective portion is curved along a curvature of the rear focal plane of the projection lens in a plan view, so as to project reflected light having a shape corresponding to a shape of the cutoff line formed by the shade toward the projection lens.

15. The vehicle headlamp according to claim 1, wherein the reflective portion has a cantilever shape protruding from the front end surface of the shade toward the projection lens.

16. The vehicle headlamp according to claim 7, wherein the movable part is configured to move to a position offset from the rear focal point of the projection lens along the optical axis while maintaining the light distribution pattern with the cutoff line, so as to blur the portion of the cutoff line.

17. The vehicle headlamp according to claim 8, wherein the fixed part maintains the second portion in a state having sharp contrast, and the movable part varies the blurriness of the first portion to be greater than that of the second portion such that regions having different sharpness along an entire length of the cutoff line are simultaneously formed.

18. The vehicle headlamp according to claim 11, wherein the movable part is configured to move forward toward the projection lens away from the rear focal plane of the projection lens when moving upward relative to the fixed part, thereby increasing the blurriness.

* * * * *